United States Patent
He et al.

(10) Patent No.: US 10,098,012 B2
(45) Date of Patent: Oct. 9, 2018

(54) COMMUNICATIONS DEVICE AND METHOD IN HIGH-FREQUENCY SYSTEM

(71) Applicant: Huawei Technologies Co., Ltd., Shenzhen (CN)

(72) Inventors: Jia He, Chengdu (CN); Ziming Yu, Chengdu (CN); Minghui Xu, Chengdu (CN)

(73) Assignee: Huawei Technologies Co., Ltd, Shenzhen (CN)

(*) Notice: Subject to any disclaimer, the term of this patent is extended or adjusted under 35 U.S.C. 154(b) by 0 days.

(21) Appl. No.: 15/413,911

(22) Filed: Jan. 24, 2017

(65) Prior Publication Data

US 2017/0134966 A1 May 11, 2017

Related U.S. Application Data

(63) Continuation of application No. PCT/CN2014/083053, filed on Jul. 25, 2014.

(51) Int. Cl.
*H04W 16/00* (2009.01)
*H04W 16/28* (2009.01)
*H04L 5/00* (2006.01)
*H04W 4/02* (2018.01)
*H04W 56/00* (2009.01)
*H04W 72/04* (2009.01)

(52) U.S. Cl.
CPC .......... *H04W 16/28* (2013.01); *H04L 5/0007* (2013.01); *H04W 4/02* (2013.01); *H04W 56/001* (2013.01); *H04W 72/0446* (2013.01)

(58) Field of Classification Search
CPC ..... H04W 16/28; H04W 4/02; H04W 56/001; H04W 72/0446; H04L 5/0007
See application file for complete search history.

(56) References Cited

U.S. PATENT DOCUMENTS

| | | | |
|---|---|---|---|
| 6,233,466 B1 | 5/2001 | Wong et al. | |
| 2004/0002363 A1* | 1/2004 | Cuffaro | H04B 7/04 455/562.1 |

(Continued)

FOREIGN PATENT DOCUMENTS

| | | |
|---|---|---|
| CN | 102026341 A | 4/2011 |
| CN | 102918879 A | 2/2013 |

(Continued)

*Primary Examiner* — Khai M Nguyen
(74) *Attorney, Agent, or Firm* — Slater Matsil, LLP

(57) ABSTRACT

A communications device in a high-frequency system, including: a scan module, configured to use a single beam for each space S region in a to-be-scanned sector of a cell to poll or cover all time T regions in the S region in a time-division manner, and send a synchronization sequence to user equipment in the T region by using a preset frame structure; and a determining module, configured to receive a sequence that is fed back by the user equipment, determine a location of the user equipment according to the sequence, and determine, according to the location of the user equipment, a serving beam for a base station to communicate with the user equipment, to confirm that scanning for the user equipment is completed. The embodiments of the present invention further provide a scanning method in a high-frequency system.

14 Claims, 7 Drawing Sheets

(56) References Cited

U.S. PATENT DOCUMENTS

| | | | |
|---|---|---|---|
| 2005/0192058 A1 | 9/2005 | Jung et al. | |
| 2013/0064239 A1 | 3/2013 | Yu et al. | |
| 2013/0215844 A1* | 8/2013 | Seol | H04W 72/046 370/329 |
| 2014/0269581 A1* | 9/2014 | Song | H04B 7/0632 370/329 |
| 2016/0157267 A1* | 6/2016 | Frenne | H04B 7/086 370/329 |
| 2017/0094531 A1* | 3/2017 | Kakishima | H04W 16/28 |
| 2017/0127367 A1* | 5/2017 | Axnas | H04W 56/0015 |
| 2017/0244464 A1* | 8/2017 | Song | H04B 7/0632 |

FOREIGN PATENT DOCUMENTS

| | | |
|---|---|---|
| CN | 103476043 A | 12/2013 |
| EP | 1566982 A2 | 8/2005 |
| KR | 20110008704 A | 1/2011 |
| KR | 20130028397 A | 3/2013 |

\* cited by examiner

COMMUNICATIONS DEVICE AND METHOD IN HIGH-FREQUENCY SYSTEM

CROSS-REFERENCE TO RELATED APPLICATIONS

This application is a continuation of International Application No. PCT/CN2014/083053, filed on Jul. 25, 2014, the disclosure of which is hereby incorporated by reference in its entirety.

TECHNICAL FIELD

The present invention relates to the field of communications technologies, and in particular, to a communications device and method in a high-frequency system.

BACKGROUND

As mobile terminals increase, a demand of a user for a data volume increases. Currently, bandwidth provided for a lower frequency band is inadequate to meet ever growing demands for communication performance. Therefore, using high frequencies (30 G to 300 G or higher) having abundant bandwidth resources as a backhaul frequency and an access frequency will become a trend. Compared with the lower frequency band, a high frequency band has one significant feature, a narrower beam. If user access is implemented by using a high-frequency narrow beam instead of a conventional low-frequency wide beam, a signal coverage (that is, signal scanning) area of a base station is reduced significantly. In this case, a relatively large quantity of beams are needed to implement cell-wide coverage of a base station signal. However, in an actual application, due to a restriction on beam freedom, one base station can emit only a limited quantity of beams, and a coverage area (that is, scan range) of each beam is limited. As a result, cell-wide coverage cannot be ensured.

In the prior art, access of multiple users is mainly implemented by using a single beam in a time division manner. In a prior-art multi-user access process, a single beam is mainly used to implement full-range time-division scanning of a base station signal for multiple users. When there are a large quantity of users evenly distributed within a coverage area (for example, a cell), in the prior-art implementation manner in which a single beam is used to implement time-division scanning of a base station signal for multiple users, a waiting time for each user is relatively long, and a throughput is reduced, resulting in poor user experience when full coverage is implemented.

SUMMARY

Embodiments of the present invention provide a communications device and method in a high-frequency system, where when multiple beams are used, a single beam may be used for each S region in a to-be-scanned sector to scan for user equipment included in all T regions in the S region, and success in signal scanning for the user equipment is determined according to a sequence that is fed back by the user equipment, thereby effectively increasing a coverage rate of a base station signal in a cell, shortening a waiting time for a user in the cell to receive the base station signal, and improving user experience in cell-wide coverage.

A first aspect of the embodiments of the present invention provides a communications device in a high-frequency system. The device may include a scan module, configured to use a single beam for each space S region in a to-be-scanned sector of a cell to poll or cover all time T regions in the S region in a time-division manner, and send a synchronization sequence to user equipment in the T region by using a preset frame structure, where the frame structure is carried in a beam signal. The device may also include a determining module, configured to receive a sequence that is fed back by the user equipment, determine a location of the user equipment according to the sequence, and determine, according to the location of the user equipment, a serving beam for a base station to communicate with the user equipment, to confirm that scanning for the user equipment is completed.

With reference to the first aspect, in a first possible implementation manner, the communications device further includes: a division module, configured to divide the to-be-scanned sector of the cell into multiple S regions according to a predefined S region division rule, and divide each of the S regions into multiple T regions according to a preset T region division rule.

With reference to the first possible implementation manner of the first aspect, in a second possible implementation manner, the S region division rule includes: evenly dividing the to-be-scanned sector of the cell to divide the to-be-scanned sector into multiple equal-sized S regions.

With reference to the first possible implementation manner of the first aspect, in a third possible implementation manner, the S region division rule includes: dividing the to-be-scanned sector of the cell according to beam widths of beams emitted by the base station, to divide the to-be-scanned sector into multiple S regions whose sizes are corresponding to the beam widths.

With reference to the second possible implementation manner of the first aspect or the third possible implementation manner of the first aspect, in a fourth possible implementation manner, the division module is specifically configured to: determine, according to a quantity of beams emitted by the base station, a quantity M of S regions resulting from division of the to-be-scanned sector, where each of the S regions is corresponding to one beam, and M is equal to the quantity of beams; and divide, according to the S region division rule, the to-be-scanned sector into M equal-sized S regions, or M S regions whose sizes are corresponding to the beam widths.

With reference to the fourth possible implementation manner of the first aspect, in a fifth possible implementation manner, the T region division rule includes: dividing all the S regions in a same division order to divide each of the S regions into multiple T regions.

With reference to the fourth possible implementation manner of the first aspect, in a sixth possible implementation manner, the T region division rule includes: dividing different S regions in different division orders to divide each of the S regions into multiple T regions.

With reference to the fifth possible implementation manner of the first aspect or the sixth possible implementation manner of the first aspect, in a seventh possible implementation manner, the division module is specifically configured to: determine, according to a beam width of a beam emitted by the base station and a size of the S region, a quantity N of T regions resulting from division of the S region; and divide each of the S regions into N T regions in the same division order or a different division order according to the T region division rule.

With reference to the fourth possible implementation manner of the first aspect or the seventh possible implementation manner of the first aspect, in an eighth possible implementation manner, in the frame structure, each radio frame includes K1 equal-sized radio subframes, each of the radio subframes includes K2 equal-sized timeslots, and each of the timeslots includes K3 OFDM symbols, where K1, K2, and K3 are positive integers.

With reference to the eighth possible implementation manner of the first aspect, in a ninth possible implementation manner, the scan module is specifically configured to: insert M OFDM symbols into one downlink timeslot in one radio subframe in the frame structure, insert the synchronization sequence into the OFDM symbols, and send the synchronization sequence to the user equipment in the T region by using the OFDM.

With reference to the ninth possible implementation manner of the first aspect, in a tenth possible implementation manner, the synchronization sequence includes a sequence ID of the beam that is emitted by the base station to scan the T region; and the ID of the beam includes a cell sequence C_ID, a sector sequence SEC_ID, a space sequence S_ID, and a time sequence T_ID.

A second aspect of the embodiments of the present invention provides a communications device in a high-frequency system. The device may include a receiving module, configured to emit a beam to perform beam signal scanning and receive beam signals transmitted by a base station. The device may also include a processing module, configured to obtain synchronization sequences from the beam signals received by the receiving module, and correlate all the synchronization sequences. The device may also include a selection module, configured to select a synchronization sequence whose correlation peak value is the largest among correlation peak values that are of all the synchronization sequences and that are obtained by means of processing by the processing module, and set a beam corresponding to the synchronization sequence as a serving beam. The device may also include a feedback module, configured to insert, into a specified orthogonal frequency division multiplexing (OFDM) symbol, a sequence corresponding to an ID of the serving beam that is selected by the selection module, and feed back the sequence corresponding to the ID of the serving beam to the base station.

With reference to the second aspect, in a first possible implementation manner, each of the beam signals transmitted by the base station and received by the receiving module carries a preset frame structure; and in the frame structure, each radio frame includes K1 equal-sized radio subframes, each of the radio subframes includes K2 equal-sized timeslots, and each of the timeslots includes K3 OFDM symbols, where K1, K2, and K3 are positive integers.

With reference to the first possible implementation manner of the second aspect, in a second possible implementation manner, the OFDM symbols in the frame structure of the beam signal include an ID of the beam, and the ID of the beam includes a cell sequence C_ID, a sector sequence SEC_ID, a space sequence S_ID, and a time sequence T_ID.

With reference to the second possible implementation manner of the second aspect, in a third possible implementation manner, the synchronization sequence is carried in the OFDM symbols and the synchronization sequence is corresponding to the ID of the beam in the OFDM symbols; and the processing module is specifically configured to: obtain the ID of the beam corresponding to the synchronization sequence from the OFDM symbols in the beam signal, and sequentially correlate the C_ID, SEC_ID, S_ID, and T_ID in the ID of the beam.

With reference to the third possible implementation manner of the second aspect, in a fourth possible implementation manner, the feedback module is specifically configured to: select an OFDM symbol corresponding to a T_ID of the serving beam from OFDM symbols in an uplink timeslot; and insert sequences corresponding to a C_ID, a SEC_ID, and an S_ID of the serving beam into the selected OFDM symbol, and feed back the sequence corresponding to the ID of the serving beam to the base station by using the uplink timeslot.

With reference to the third possible implementation manner of the second aspect, in a fifth possible implementation manner, the feedback module is specifically configured to: predefine an OFDM symbol in the uplink timeslot; and insert sequences corresponding to a C_ID, a SEC_ID, an S_ID, and a T_ID of the serving beam into the predefined OFDM symbol, and feed back the sequence corresponding to the ID of the serving beam to the base station by using the uplink timeslot.

With reference to the fourth possible implementation manner of the second aspect or the fifth possible implementation manner of the second aspect, in a sixth possible implementation manner, the sequences corresponding to the C_ID, SEC_ID, S_ID, and T_ID of the serving beam are all predefined orthogonal sequences.

A third aspect of the embodiments of the present invention provides a base station. The base station may include a processor, configured to use a single beam for each space S region in a to-be-scanned sector of a cell to poll or cover all time T regions in the S region in a time-division manner. The base station may also include a transmitter, configured to send, by using a preset frame structure, a synchronization sequence to user equipment in the T region that is obtained by means of processing by the processor, where the frame structure is carried in a beam signal. The base station may also include a receiver, configured to receive a sequence that is fed back by the user equipment, where the processor is further configured to determine a location of the user equipment according to the sequence, and determine, according to the location of the user equipment, a serving beam for the base station to communicate with the user equipment, to confirm that scanning for the user equipment is completed.

With reference to the third aspect, in a first possible implementation manner, the processor is further specifically configured to divide the to-be-scanned sector of the cell into multiple S regions according to a predefined S region division rule, and divide each of the S regions into multiple T regions according to a preset T region division rule.

With reference to the first possible implementation manner of the third aspect, in a second possible implementation manner, the S region division rule includes: evenly dividing the to-be-scanned sector of the cell to divide the to-be-scanned sector into multiple equal-sized S regions.

With reference to the first possible implementation manner of the third aspect, in a third possible implementation manner, the S region division rule includes: dividing the to-be-scanned sector of the cell according to beam widths of beams emitted by the base station, to divide the to-be-scanned sector into multiple S regions whose sizes are corresponding to the beam widths.

With reference to the second possible implementation manner of the third aspect or the third possible implementation manner of the third aspect, in a fourth possible implementation manner, the processor is specifically configured to: determine, according to a quantity of beams emitted by the base station, a quantity M of S regions resulting from division of the to-be-scanned sector, where each of the S regions is corresponding to one beam, and M is equal to the quantity of beams; and divide, according to the S region division rule, the to-be-scanned sector into M equal-sized S regions, or M S regions whose sizes are corresponding to the beam widths.

With reference to the fourth possible implementation manner of the third aspect, in a fifth possible implementation manner, the T region division rule includes: dividing all the S regions in a same division order to divide each of the S regions into multiple T regions.

With reference to the fourth possible implementation manner of the third aspect, in a sixth possible implementation manner, the T region division rule includes: dividing different S regions in different division orders to divide each of the S regions into multiple T regions.

With reference to the fifth possible implementation manner of the third aspect or the sixth possible implementation manner of the third aspect, in a seventh possible implementation manner, the processor is specifically configured to: determine, according to a beam width of a beam emitted by the base station and a size of the S region, a quantity N of T regions resulting from division of the S region; and divide each of the S regions into N T regions in the same division order or a different division order according to the T region division rule.

With reference to the fourth possible implementation manner of the third aspect or the seventh possible implementation manner of the third aspect, in an eighth possible implementation manner, in the frame structure, each radio frame includes K1 equal-sized radio subframes, each of the radio subframes includes K2 equal-sized timeslots, and each of the timeslots includes K3 OFDM symbols, where K1, K2, and K3 are positive integers.

With reference to the eighth possible implementation manner of the third aspect, in a ninth possible implementation manner, the transmitter is specifically configured to: insert M OFDM symbols into one downlink timeslot in one radio subframe in the frame structure, insert the synchronization sequence into the OFDM symbols, and send the synchronization sequence to the user equipment in the T region by using the OFDM.

With reference to the ninth possible implementation manner of the third aspect, in a tenth possible implementation manner, the synchronization sequence includes a sequence ID of the beam that is emitted by the base station to scan the T region; and the ID of the beam includes a cell sequence C_ID, a sector sequence SEC_ID, a space sequence S_ID, and a time sequence T_ID.

A fourth aspect of the embodiments of the present invention provides user equipment. The user equipment may also include a receiver, configured to emit a beam to perform beam signal scanning and receive beam signals transmitted by a base station. The user equipment may also include a processor, configured to obtain synchronization sequences from the beam signals received by the receiver, and correlate all the synchronization sequences, where the processor is configured to select a synchronization sequence whose correlation peak value is the largest among correlation peak values of all the synchronization sequences, and set a beam corresponding to the synchronization sequence as a serving beam. The processor is configured to insert a sequence corresponding to an ID of the serving beam into a specified orthogonal frequency division multiplexing OFDM symbol. The user equipment may also include a transmitter, configured to feed back the sequence corresponding to the ID of the serving beam to the base station.

With reference to the fourth aspect, in a first possible implementation manner, each of the beam signals transmitted by the base station and received by the receiver carries a preset frame structure; and in the frame structure, each radio frame includes K1 equal-sized radio subframes, each of the radio subframes includes K2 equal-sized timeslots, and each of the timeslots includes K3 OFDM symbols, where K1, K2, and K3 are positive integers.

With reference to the first possible implementation manner of the fourth aspect, in a second possible implementation manner, the OFDM symbols in the frame structure of the beam signal include an ID of the beam, and the ID of the beam includes a cell sequence C_ID, a sector sequence SEC_ID, a space sequence S_ID, and a time sequence T_ID.

With reference to the second possible implementation manner of the fourth aspect, in a third possible implementation manner, the synchronization sequence is carried in the OFDM symbols and the synchronization sequence is corresponding to the ID of the beam in the OFDM symbols; and the processor is specifically configured to: obtain the ID of the beam corresponding to the synchronization sequence from the OFDM symbols in the beam signal, and sequentially correlate the C_ID, SEC_ID, S_ID, and T_ID in the ID of the beam.

With reference to the third possible implementation manner of the fourth aspect, in a fourth possible implementation manner, the processor is specifically configured to: select an OFDM symbol corresponding to a T_ID of the serving beam from OFDM symbols in an uplink timeslot; and insert sequences corresponding to a C_ID, a SEC_ID, and an S_ID of the serving beam into the selected OFDM symbol; and the transmitter is specifically configured to: feed back the sequence corresponding to the ID of the serving beam to the base station by using the uplink timeslot.

With reference to the third possible implementation manner of the fourth aspect, in a fifth possible implementation manner, the processor is specifically configured to: predefine an OFDM symbol in the uplink timeslot; and insert sequences corresponding to a C_ID, a SEC_ID, an S_ID and a T_ID of the serving beam into the predefined OFDM symbol; and the transmitter is specifically configured to: feed back the sequence corresponding to the ID of the serving beam to the base station by using the uplink timeslot.

With reference to the fourth possible implementation manner of the fourth aspect or the fifth possible implementation manner of the fourth aspect, in a sixth possible implementation manner, the sequences corresponding to the C_ID, SEC_ID, S_ID, and T_ID of the serving beam are all predefined orthogonal sequences.

A fifth aspect of the embodiments of the present invention provides a scanning method in a high-frequency system, which may include: using, by a base station, a single beam for each space S region in a to-be-scanned sector of a cell to poll or cover all time T regions in the S region in a time-division manner, and sending a synchronization sequence to user equipment in the T region by using a preset frame structure, where the frame structure is carried in a beam signal; and receiving, by the base station, a sequence that is fed back by the user equipment, determining a location of the user equipment according to the sequence, and determining, according to the location of the user equipment, a serving beam for the base station to communicate with the user equipment, to confirm that scanning for the user equipment is completed.

With reference to the fifth aspect, in a first possible implementation manner, before the using, by a base station, a single beam for each space S region in a to-be-scanned sector of a cell to poll or cover all time T regions in the S region in a time-division manner, the method further includes: dividing the to-be-scanned sector of the cell into multiple S regions according to a predefined S region division rule, and dividing each of the S regions into multiple T regions according to a preset T region division rule.

With reference to the first possible implementation manner of the fifth aspect, in a second possible implementation manner, the S region division rule includes: evenly dividing the to-be-scanned sector of the cell to divide the to-be-scanned sector into multiple equal-sized S regions.

With reference to the first possible implementation manner of the fifth aspect, in a third possible implementation manner, the S region division rule includes: dividing the to-be-scanned sector of the cell according to beam widths of beams emitted by the base station, to divide the to-be-scanned sector into multiple S regions whose sizes are corresponding to the beam widths.

With reference to the second possible implementation manner of the fifth aspect or the third possible implementation manner of the fifth aspect, in a fourth possible implementation manner, the dividing the to-be-scanned sector of the cell into multiple S regions according to a predefined S region division rule includes: determining, according to a quantity of beams emitted by the base station, a quantity M of S regions resulting from division of the to-be-scanned sector, where each of the S regions is corresponding to one beam, and M is equal to the quantity of beams; and dividing, according to the S region division rule, the to-be-scanned sector into M equal-sized S regions, or M S regions whose sizes are corresponding to the beam widths.

With reference to the fourth possible implementation manner of the fifth aspect, in a fifth possible implementation manner, the T region division rule includes: dividing all the S regions in a same division order to divide each of the S regions into multiple T regions.

With reference to the fourth possible implementation manner of the fifth aspect, in a sixth possible implementation manner, the T region division rule includes: dividing different S regions in different division orders to divide each of the S regions into multiple T regions.

With reference to the fifth possible implementation manner of the fifth aspect or the sixth possible implementation manner of the fifth aspect, in a seventh possible implementation manner, the dividing each of the S regions into multiple T regions according to a preset T region division rule includes: determining, according to a beam width of a beam emitted by the base station and a size of the S region, a quantity N of T regions resulting from division of the S region; and dividing each of the S regions into N T regions in the same division order or a different division order according to the T region division rule.

With reference to the fourth possible implementation manner of the fifth aspect or the seventh possible implementation manner of the fifth aspect, in an eighth possible implementation manner, in the frame structure, each radio frame includes K1 equal-sized radio subframes, each of the radio subframes includes K2 equal-sized timeslots, and each of the timeslots includes K3 OFDM symbols, where K1, K2, and K3 are positive integers.

With reference to the eighth possible implementation manner of the fifth aspect, in a ninth possible implementation manner of the fifth aspect, the sending a synchronization sequence to user equipment in the T region by using a preset frame structure includes: inserting M OFDM symbols into one downlink timeslot in one radio subframe in the frame structure, inserting the synchronization sequence into the OFDM symbols, and sending the synchronization sequence to the user equipment in the T region by using the OFDM.

With reference to the ninth possible implementation manner of the fifth aspect, in a tenth possible implementation manner, the synchronization sequence includes a sequence ID of the beam that is emitted by the base station to scan the T region; and the ID of the beam includes a cell sequence C_ID, a sector sequence SEC_ID, a space sequence S_ID, and a time sequence T_ID.

A sixth aspect of the embodiments of the present invention provides a scanning method in a high-frequency system. The method may include emitting, by user equipment, a beam to perform beam signal scanning and receive beam signals transmitted by a base station. The method may also include obtaining, by the user equipment, synchronization sequences from the beam signals, and correlating all the synchronization sequences. The method may also include selecting, by the user equipment, a synchronization sequence whose correlation peak value is the largest among correlation peak values of all the synchronization sequences, and setting a beam corresponding to the synchronization sequence as a serving beam. The method may also include inserting, by the user equipment, a sequence corresponding to an ID of the serving beam into a specified orthogonal frequency division multiplexing OFDM symbol, and feeding back the sequence corresponding to the ID of the serving beam to the base station.

With reference to the sixth aspect, in a first possible implementation manner, each of the beam signals transmitted by the base station carries a preset frame structure; and in the frame structure, each radio frame includes K1 equal-sized radio subframes, each of the radio subframes includes K2 equal-sized timeslots, and each of the timeslots includes K3 OFDM symbols, where K1, K2, and K3 are positive integers.

With reference to the first possible implementation manner of the sixth aspect, in a second possible implementation manner, the OFDM symbols in the frame structure of the beam signal include an ID of the beam, and the ID of the beam includes a cell sequence C_ID, a sector sequence SEC_ID, a space sequence S_ID, and a time sequence T_ID.

With reference to the second possible implementation manner of the sixth aspect, in a third possible implementation manner, the synchronization sequence is carried in the OFDM symbols and the synchronization sequence is corresponding to the ID of the beam in the OFDM symbols; and the obtaining, by the user equipment, synchronization sequences from the beam signals, and correlating all the synchronization sequences includes: obtaining, by the user equipment, the ID of the beam corresponding to the synchronization sequence from the OFDM symbols in the beam signal, and sequentially correlating the C_ID, SEC_ID, S_ID, and T_ID in the ID of the beam.

With reference to the third possible implementation manner of the sixth aspect, in a fourth possible implementation manner, the inserting, by the user equipment, a sequence corresponding to an ID of the serving beam into a specified orthogonal frequency division multiplexing OFDM symbol, and feeding back the sequence corresponding to the ID of the serving beam to the base station includes: selecting, by the user equipment, an OFDM symbol corresponding to a T_ID of the serving beam from OFDM symbols in an uplink timeslot; and inserting, by the user equipment, sequences corresponding to a C_ID, a SEC_ID, and an S_ID of the serving beam into the selected OFDM symbol, and feeding back the sequence corresponding to the ID of the serving beam to the base station by using the uplink timeslot.

With reference to the third possible implementation manner of the sixth aspect, in a fifth possible implementation manner, the inserting, by the user equipment, a sequence corresponding to an ID of the serving beam into a specified orthogonal frequency division multiplexing OFDM symbol, and feeding back the sequence corresponding to the ID of the serving beam to the base station includes: predefining, by the user equipment, an OFDM symbol in the uplink timeslot; and inserting, by the user equipment, sequences corresponding to a C_ID, a SEC_ID, an S_ID, and a T_ID of the serving beam into the predefined OFDM symbol, and feeding back the sequence corresponding to the ID of the serving beam to the base station by using the uplink timeslot.

With reference to the fourth possible implementation manner of the sixth aspect or the fifth possible implementation manner of the sixth aspect, in a sixth possible implementation manner, the sequences corresponding to the C_ID, SEC_ID, S_ID, and T_ID of the serving beam are all predefined orthogonal sequences.

In the embodiments of the present invention, when multiple beams are used, a communications device may use a single beam for each S region in a to-be-scanned sector of a cell to poll or cover all T regions in the S region in a time-division manner, and send, by using a preset frame structure, a synchronization sequence to a user in a T region that is scanned by the single beam, to implement coverage of a base station signal for the user included in the T region. Further, the communications device may determine a location of user equipment according to a sequence that is fed back by the user equipment, so as to access the user equipment and shorten a waiting time for each user to receive the base station signal. This effectively improves a coverage rate of the base station signal for multiple users in the cell, improves experience of users in the cell, and reduces costs for cell-wide coverage.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
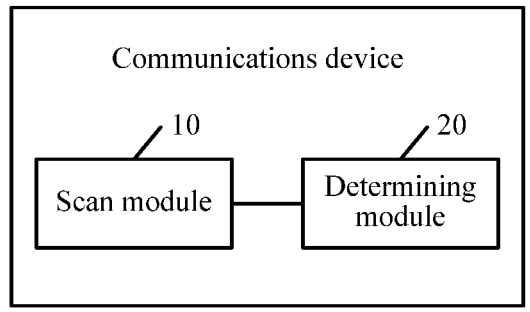
FIG. 1 is a schematic structural diagram of a first embodiment of a communications device in a high-frequency system according to the embodiments of the present invention.

Refer to FIG. 1, which is a schematic structural diagram of a first embodiment of a communications device in a high-frequency system according to the embodiments of the present invention. The communications device described in this embodiment includes: a scan module 10, configured to use a single beam for each space S region in a to-be-scanned sector of a cell to poll or cover all time T regions in the S region in a time-division manner, and send a synchronization sequence to user equipment in the T region by using a preset frame structure, where the frame structure is carried in a beam signal. The communication device also includes a determining module 20, configured to receive a sequence that is fed back by the user equipment, determine a location of the user equipment according to the sequence, and determine, according to the location of the user equipment, a serving beam for a base station to communicate with the user equipment, to confirm that scanning for the user equipment is completed.

In some feasible implementation manners, the communications device described in this embodiment may be specifically a base station, or a device applied to a base station. In this embodiment of the present invention, a base station is used as an example for specific description.

In some feasible implementation manners, to implement full coverage (that is, signal scanning) of a base station signal in a cell, a base station first needs to implement signal coverage in each sector of the cell, and further implements full coverage of the base station signal in the cell by covering all sectors. Therefore, in this embodiment of the present invention, an implementation manner in which a base station covers a sector of a cell is first described specifically. When the base station implements coverage in all sectors of the cell, full coverage in the cell can be implemented.

In specific implementation, the base station may divide a sector of the cell into multiple space regions (S regions for short). Specifically, the cell may be any one of multiple cells that are covered by the base station, and the cell may include multiple sectors. Coverage in any one sector is used as an example for specific description in this embodiment of the present invention. In this embodiment of the present invention, a division action of dividing a sector of the cell into multiple S regions may be executed by the base station or be executed by another device. That is, the another device may be used to divide the cell into the multiple S regions and then send a division result to the base station, and the base station is used to implement signal coverage in the S regions. In addition, a division action of dividing an S region into multiple T regions described in this embodiment of the present invention may also be executed by the base station or be executed by another device, and after performing the division, the another device sends a division result to the base station, and the base station implements coverage in the T regions in the S region. No limitation is imposed herein. In the embodiments of the present invention, a base station divides a sector of a cell into multiple S regions, and then divides each S region into multiple T regions, and a scanning method and an apparatus described in the embodiments of the present invention are described specifically on this basis. Details are not described again in the following embodiments.

In some feasible implementation manners, the base station may divide, according to a preset S region division rule, the to-be-scanned sector (that is, any one sector of the cell) in the cell into the multiple S regions (in this embodiment of the present invention, M is used to represent a quantity of S regions resulting from division of the to-be-scanned sector, M is a positive integer, and a magnitude of M may be defined according to an actual situation). Specifically, according to the preset S region division rule, the base station may evenly divide the to-be-scanned sector into M equal-sized S regions, or may divide the to-be-scanned sector into M unequal-sized S regions. After dividing the to-be-scanned sector into the M S regions, the base station may further divide each of the S regions into multiple smaller regions. That is, the base station may divide, according to a preset time region (T region for short) division rule, each S region into multiple T regions (in this embodiment of the present invention, N is used to represent a quantity of T regions resulting from division of the S region, N is a positive integer, and a magnitude of N may be defined according to an actual situation). For example, the base station may divide the to-be-scanned sector of the cell covered by the base station into 16 S regions, and the 16 S regions may be arranged according to a scan direction of a beam emitted by the base station, that is, the 16 S regions may be arranged into a 4×4 region according to a horizontal scan direction and a vertical scan direction of the beam. After dividing the sector into the 16 S regions, the base station may further divide each S region into 16 T regions, and may further arrange the 16 T regions according to a preset T region division rule. The base station may scan each T region to implement signal coverage in an S region by means of signal coverage in all T regions, implement signal coverage in an entire sector by means of signal coverage in all S regions, and implement signal coverage in the entire cell by means of signal coverage in all sectors.

In some feasible implementation manners, after dividing the to-be-scanned sector into multiple S regions and dividing each S region into multiple T regions, the base station may poll or cover all the T regions. Specifically, the scan module 10 of the base station may emit multiple beams (for example, M1 beams, where M1 is a positive integer), and each beam may correspondingly cover one S region. In each S region, the scan module 10 may use a single beam to poll or cover all T regions in the S region in a time-division manner. That is, all T regions in a same S region may receive a same beam emitted by the base station. For example, the scan module 10 may emit 16 high-frequency narrow beams, each beam correspondingly covers one S region, and in each S region, each beam polls and covers all T regions in a time-division manner. That is, a beam that covers an S region (for example, an Sn region) may point to different T regions in the Sn region at different time points. For example, the beam may point to a Tn region in the Sn region at a Tn time point to scan the Tn region.

Figure 2:
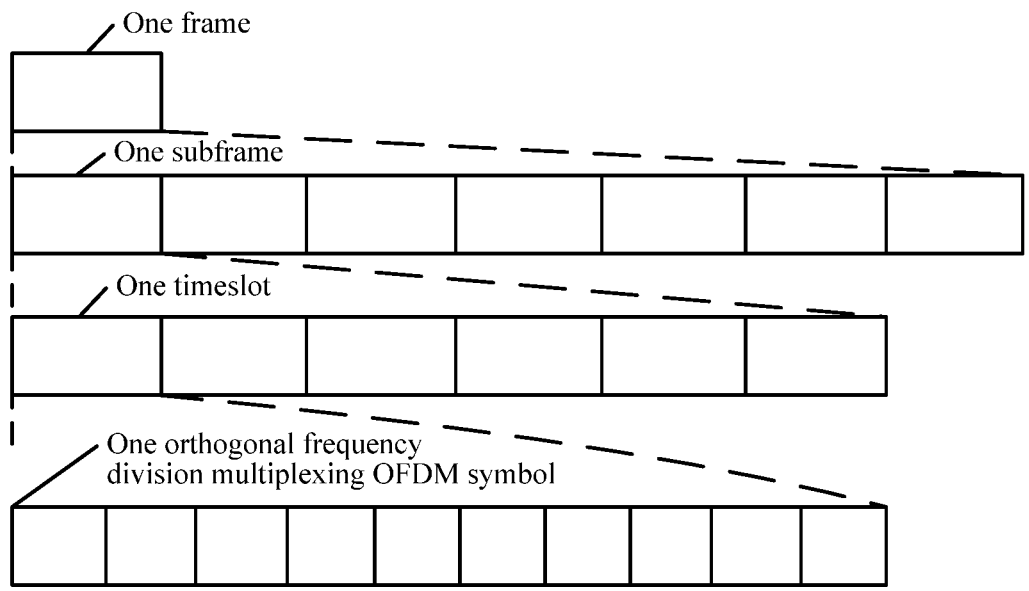
FIG. 2 is a schematic diagram of a frame structure in a first embodiment of a communications device in a high-frequency system according to the embodiments of the present invention.

In some feasible implementation manners, when scanning T regions in an S region by using a beam emitted by the scan module 10, the scan module 10 may also add, to a beam signal, a synchronization sequence that is to be sent to user equipment, and sends the synchronization sequence to the user equipment. Specifically, in this embodiment of the present invention, a frame structure may be predefined. As shown in FIG. 2, in the foregoing frame structure, each radio frame may include K1 equal-sized radio subframes, each radio subframe may include K2 equal-sized timeslots, and each timeslot may include K3 OFDM symbols, where K1, K2, and K3 are positive integers, and magnitudes of K1, K2, and K3 may be defined according to an actual situation. Specifically, the base station may insert multiple OFDM symbols into one downlink timeslot in one radio subframe in the frame structure, for sending the synchronization sequence to the user equipment. A quantity of inserted OFDM symbols is equal to the quantity of T regions. In specific implementation, an OFDM symbol includes multiple subcarriers in a frequency domain, and the base station may modulate a corresponding sequence symbol onto some specific subcarriers in the OFDM symbol, so as to insert the synchronization sequence into the OFDM symbol, and send the synchronization sequence to user equipment in a T region by using the OFDM symbol.

In some feasible implementation manners, the scan module 10 polls and covers all T regions in each S region in a time-division manner and sends the synchronization sequence to user equipment in each of the T regions by using the frame structure. After receiving the beam signal sent by the base station, the user equipment may obtain the synchronization sequence from the beam signal and further feed back a corresponding sequence according to the obtained synchronization sequence. After receiving the sequence sent by the user equipment, the determining module 20 of the base station may determine the location of the user equipment according to the sequence, and determines, according to the location of the user equipment, the serving beam for the base station to communicate with the user equipment, to confirm that scanning (that is, signal coverage) for the user equipment is completed.

In this embodiment of the present invention, a base station may divide a to-be-scanned sector into multiple S regions and divides each S region into multiple T regions; a scan module may poll all the T regions in each S region in a time-division manner, and further send a synchronization sequence to user equipment in a T region by using a preset frame structure; a determining module may determine a location of the user equipment according to a sequence that is fed back by the user equipment, and determine, according to the location of the user equipment, a serving beam for the base station to communicate with the user equipment, so as to complete access to the user equipment. In this embodiment of the present invention, when multiple beams are used, a single beam may be used to poll all T regions in a time-division manner, which effectively improves a cell coverage rate under a beam freedom restricted condition, improves user experience in using high-frequency narrow beams to implement cell-wide coverage, and reduces costs for cell-wide coverage.

Figure 3:
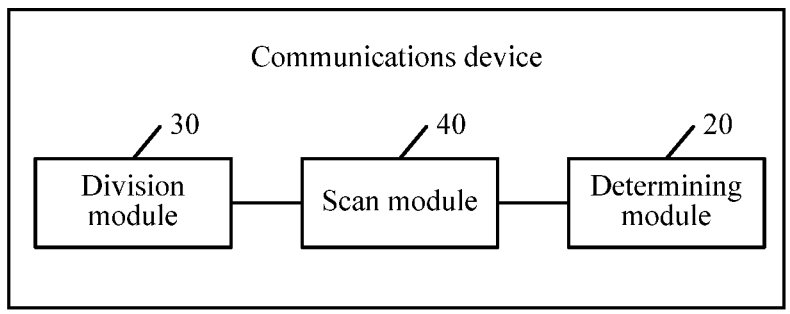
FIG. 3 is a schematic structural diagram of a second embodiment of a communications device in a high-frequency system according to the embodiments of the present invention.

Refer to FIG. 3, which is a schematic structural diagram of a second embodiment of a communications device in a high-frequency system according to the embodiments of the present invention. The communications device described in this embodiment includes: a division module 30, configured to divide a to-be-scanned sector of a cell into multiple S regions according to a predefined S region division rule, and divide each of the S regions into multiple T regions according to a preset T region division rule; a scan module 40, configured to use a single beam for each space S region in the to-be-scanned sector of the cell to poll or cover all time T regions in the S region in a time-division manner, and send a synchronization sequence to user equipment in the T region by using a preset frame structure, where the frame structure is carried in a beam signal; and a determining module 20, configured to receive a sequence that is fed back by the user equipment, determine a location of the user equipment according to the sequence, and determine, according to the location of the user equipment, a serving beam for a base station to communicate with the user equipment, to confirm that scanning for the user equipment is completed.

In some feasible implementation manners, the division module 30 is specifically configured to: determine, according to a quantity of beams emitted by the base station, a quantity M of S regions resulting from division of the to-be-scanned sector, where each of the S regions is corresponding to one beam, and M is equal to the quantity of beams; and divide, according to the S region division rule, the to-be-scanned sector into M equal-sized S regions, or M S regions whose sizes are corresponding to widths of the beams.

In some feasible implementation manners, the division module 30 is specifically configured to: determine, according to a beam width of a beam emitted by the base station and a size of the S region, a quantity N of T regions resulting from division of the S region; and divide each of the S regions into N T regions in a same division order or a different division order according to the T region division rule.

In some feasible implementation manners, the scan module 40 is specifically configured to: insert M OFDM symbols into one downlink timeslot in one radio subframe in the frame structure, insert the synchronization sequence into the OFDM symbols, and send the synchronization sequence to the user equipment in the T region by using the OFDM.

In some feasible implementation manners, the communications device described in this embodiment of the present invention may use the division module 30 to perform region division on a cell. For a specific implementation process in which the division module 30 performs region division on a cell, refer to the specific implementation manner described in the first embodiment of the communications device in a high-frequency system according to the embodiments of the present invention, in which a base station performs region division on a cell. Details are not described herein again.

Figure 4:
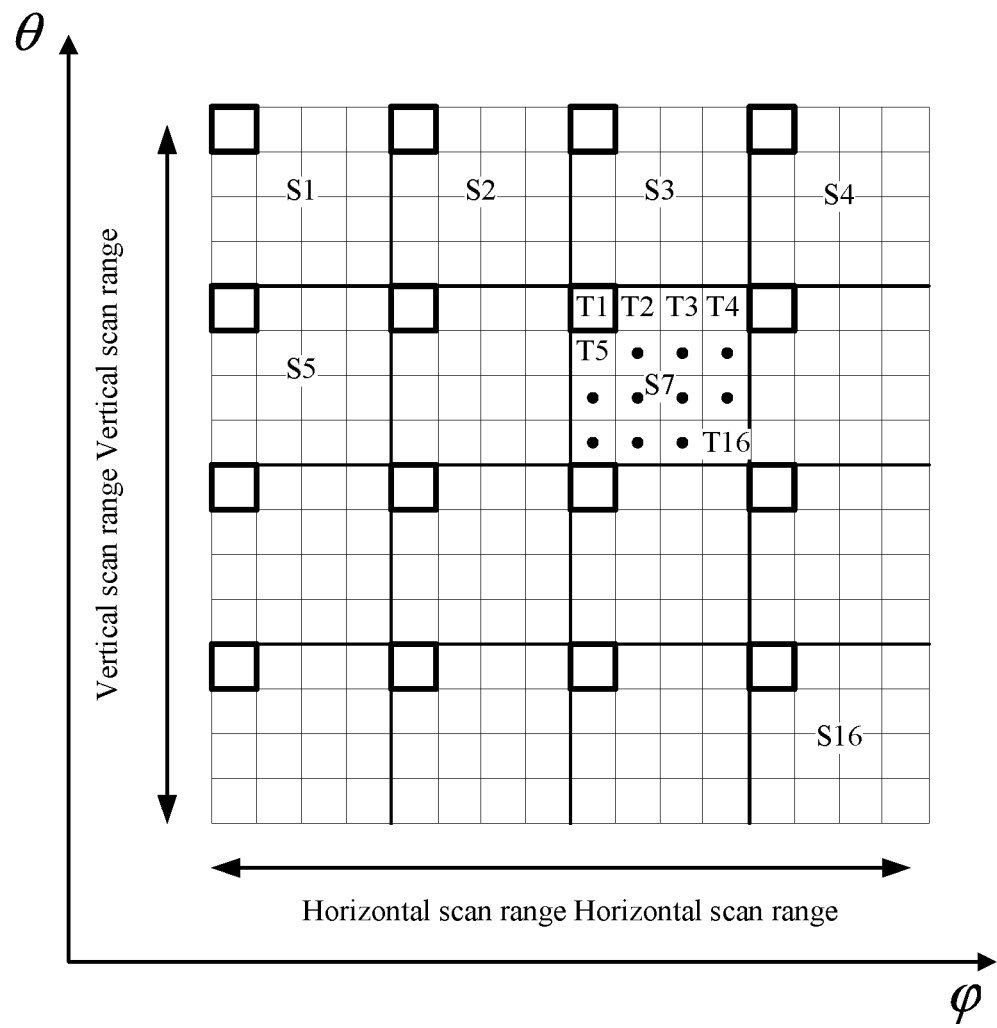
FIG. 4 is a schematic diagram of region division in a second embodiment of a communications device in a high-frequency system according to the embodiments of the present invention.

Further, when the division module 10 performs region division on the cell, the S region division rule and the T region division rule are further defined. Specifically, the S region division rule may include: evenly dividing the to-be-scanned sector of the cell to divide the to-be-scanned sector into multiple equal-sized S regions; or dividing the to-be-scanned sector of the cell according to beam widths of beams emitted by the base station, to divide the to-be-scanned sector into multiple S regions whose sizes are corresponding to the beam widths. In specific implementation, when the division module 30 divides the to-be-scanned sector of the cell, the beam widths of the beams emitted by the scan module 40 may not be considered, and the to-be-scanned sector is directly divided into multiple equal-sized S regions. If the beam widths of the beams emitted by the scan module 40 are considered, the division module 30 may divide the to-be-scanned sector of the cell according to the beam widths of the beams emitted by the scan module 40. Specifically, when a same beam width is used for the beams emitted by the scan module 40, when dividing the to-be-scanned sector, the division module 30 may evenly divide the to-be-scanned sector, that is, may divide a to-be-scanned region (that is, the to-be-scanned sector) into equal-sized regions. In this case, a division result of the to-be-scanned sector is the same as a division result of the to-be-scanned sector when the beam widths are not considered. As shown in FIG. 4, when a same beam width is used for the beams emitted by the scan module 40, the division module 30 may divide the to-be-scanned sector into multiple equal-sized S regions (for example, S1-S16, 16 equal-sized regions). In addition, when different beam widths are used for the beams emitted by the scan module 40, when dividing the to-be-scanned sector, the division module 30 may unevenly divide the to-be-scanned sector, that is, may divide, according to a specific beam width of each beam, a to-be-scanned region (that is, the to-be-scanned sector) into multiple unequal-sized regions corresponding to the beam widths. For example, when different beam widths are used for the beams emitted by the scan module 40, the division module 30 may divide the to-be-scanned sector into 16 S regions, where sizes of the S regions are unequal, and a size of each S region is specifically corresponding to the beam width of each beam. In specific implementation, the division module 30 may divide the to-be-scanned sector of the cell into multiple (for example, M) S regions according to the preset S region division rule. Specifically, the division module 30 may first determine a quantity M1 of beams that are emitted by the scan module 40, and determines, according to M1, the quantity M of S regions resulting from division of the to-be-scanned sector. Among the beams emitted by the base station, one beam may cover one S region. Therefore, the division module 30 may determine, according to the quantity of beams emitted by the scan module 40, the quantity of S regions resulting from division of the to-be-scanned sector into S regions, that is, M is equal to M1. After M is determined, the division module 30 may divide, according to the S region division rule, the to-be-scanned sector into M equal-sized S regions, or M S regions whose sizes are corresponding to the beam widths. In addition, in this embodiment of the present invention, the sizes of the S regions may be determined jointly by a quantity of antenna array elements and a cell range. More antenna array elements indicate more beams that can be formed, that is, more beams that can be emitted by the base station; and the quantity of S regions is corresponding to the quantity of beams, that is, M is equal to M1. Therefore, when the quantity of antenna array elements is definite, a larger cell range indicates a corresponding larger size of each S region; and when the cell range is definite, more antenna array elements indicate a corresponding smaller size of each S region.

Figure 5:
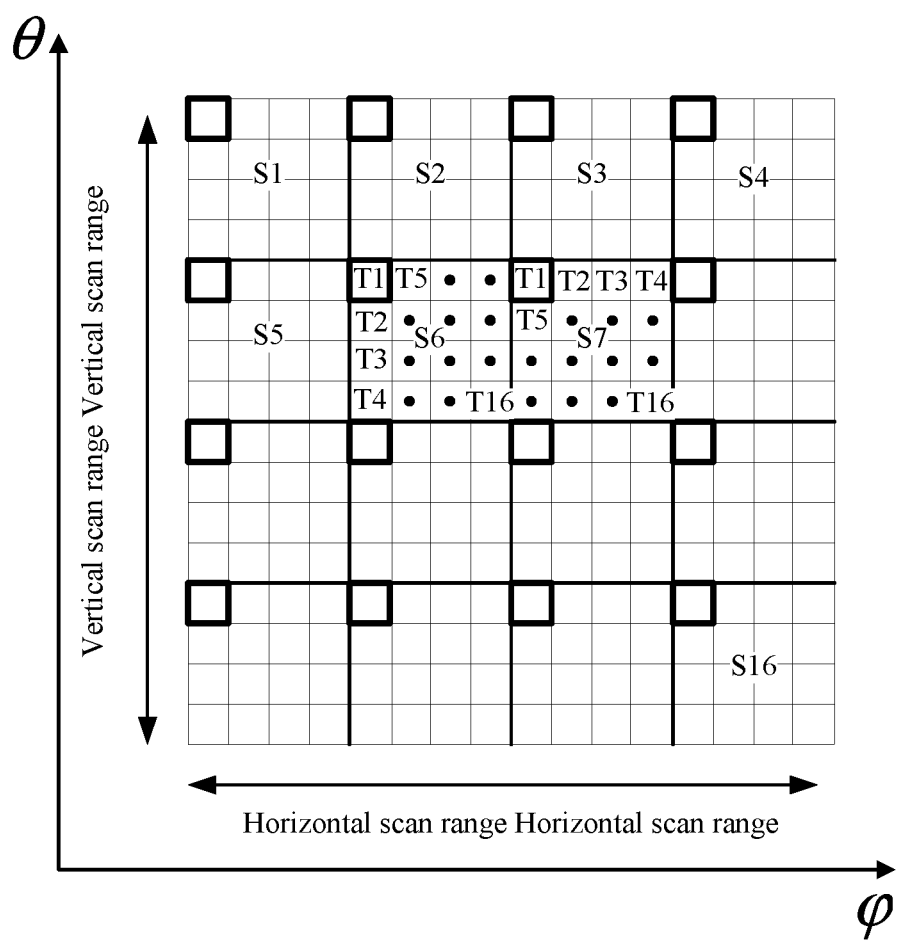
FIG. 5 is a schematic diagram of another region division in a second embodiment of a communications device in a high-frequency system according to the embodiments of the present invention.

In some feasible implementation manners, the division module 30 further defines the T region division rule. Specifically, the T region division rule may include: dividing all the S regions in a same division order to divide each S region into multiple T regions; or dividing different S regions in different division orders to divide each S region into multiple T regions. In specific implementation, when dividing an S region (for example an Sn region), the division module 30 may first determine, according to a beam width of a beam emitted by the scan module 40 and a size of the Sn region, the quantity N of T regions resulting from division of the Sn region. Specifically, according to a beam width of a beam emitted by the base station a region size for each scan by the beam may be determined, and with reference to the size of the Sn region, how many scans the beam needs to perform to poll the entire S region may be determined. Therefore, the division module 30 may determine, according to the beam width of the beam emitted by the scan module 40 and the size of the Sn region, the quantity N of regions (that is, the quantity of T regions) resulting from division of the S region. After determining the N T regions resulting from division of the Sn region, the division module 30 may divide the Sn region into N T regions in a division order (a same division order or a different division order) specified in the T region division rule. As shown in FIG. 4, the division module 30 may divide an S7 region into 16 even T regions according to a beam width and a size of the S7 region. Specifically, the division module 30 may divide the S7 region into 16 T regions in a division order specified in the preset T region division rule (assumably a division rule 1). In addition, the division module 30 may further divide another S region into 16 T regions according to the division rule 1, and each division order of T regions is the same as the division order of T regions in the S7 region. In specific implementation, as shown in FIG. 5, the division module 30 may alternatively divide the S7 region into 16 even T regions according to a beam width and a size of the S7 region. Specifically, the division module 30 may divide the S7 region into 16 T regions in a division order specified in the preset T region division rule (assumably a division rule 2), and divide another S region into 16 regions according to the division rule 2. In addition, no division order of T regions is the same as the division rule T regions in the S7 region, for example, an S6 region and the S7 region.

In some feasible implementation manners, after the division module 30 divides the to-be-scanned sector into multiple S regions and divides each S region into multiple T regions, the scan module 40 may poll or cover all the T regions. In specific implementation, the scan module 40 described in this embodiment may implement a function of the scan module 10 described in the first embodiment of the communications device in a high-frequency system according to the embodiments of the present invention. For a specific implementation process in which the scan module 40 polls and covers all T regions, refer to the specific implementation manner of the scan module 10 in the first embodiment of the scanning method in a high-frequency system according to the embodiments of the present invention. Details are not described herein again.

Further, when scanning T regions in an S region by using a beam emitted by the scan module 40, the scan module 40 may also add, to a beam signal, a synchronization sequence that is to be sent to user equipment, and sends the synchronization sequence to the user equipment. Specifically, in this embodiment of the present invention, a frame structure may be predefined. As shown in FIG. 2, in the foregoing frame structure, each radio frame may include K1 equal-sized radio subframes, each radio subframe may include K2 equal-sized timeslots, and each timeslot may include K3 OFDM symbols, where K1, K2, and K3 are positive integers. Specifically, the base station may insert multiple OFDM symbols into one downlink timeslot in one radio subframe in the frame structure, for sending the synchronization sequence to the user equipment. A quantity of inserted OFDM symbols is equal to the quantity of T regions. In specific implementation, an OFDM symbol includes multiple subcarriers in a frequency domain, and the base station may modulate a corresponding sequence symbol onto some specific subcarriers in the OFDM symbol, so as to insert the synchronization sequence into the OFDM symbol, and send the synchronization sequence to user equipment in a T region by using the OFDM symbol.

Further, in this embodiment of the present invention, the synchronization sequence that is sent by the scan module 40 to the user equipment may include an ID of the beam that is emitted by the base station to cover the T region. The T region (assumably T1) covered by the beam is a T region in which the user equipment is located. Specifically, the ID of the beam may include a cell sequence C_ID, a sector sequence SEC_ID, a space sequence S_ID, and a time sequence T_ID. The T_ID is an ID corresponding to T1, the S_ID is an ID of an S region (assumably S6) in which T1 is located, the SEC_ID is an ID of a sector (assumably a sector 1) in which S6 is located, and the C_ID is an ID of a cell in which the sector 1 is located.

In some feasible implementation manners, after the scan module 40 polls and covers all T regions in each S region in a time-division manner and sends the synchronization sequence to user equipment in each of the T regions by using the frame structure, the user equipment may emit a narrow beam to perform scanning and receive the beam signal transmitted by the base station. After receiving the beam signal sent by the base station, the user equipment may obtain the synchronization sequence from the beam signal and further feed back a corresponding sequence according to the obtained synchronization sequence. After receiving the sequence sent by the user equipment, the determining module 20 of the base station may determine a location of the user equipment, to confirm that scanning for the user equipment is completed.

In this embodiment of the present invention, a base station may use a division module to evenly (or unevenly) divide a to-be-scanned sector into multiple S regions according to a predefined S region division rule and divide each S region into multiple T regions according to a predefined T region division rule; and further use a scan module 40 to poll all T regions in each S region in a time-division manner. In addition, the base station may send a synchronization sequence to user equipment in the T region by using a preset frame structure; and finally determine, by using a determining module, a location of the user equipment according to a sequence that is fed back by the user equipment. In this embodiment of the present invention, when multiple beams are used, a single beam may be used to poll all T regions in a time-division manner, which effectively improves a cell coverage rate under a beam freedom restricted condition, improves user experience in using high-frequency narrow beams to implement cell-wide coverage, and reduces costs for cell-wide coverage.

Figure 6:
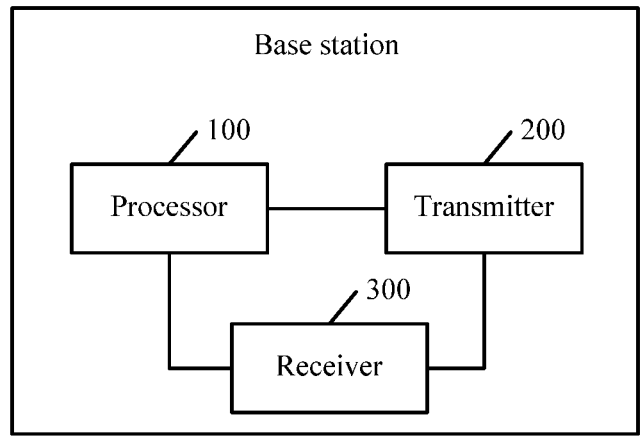
FIG. 6 is a schematic structural diagram of an embodiment of a base station according to the embodiments of the present invention.

Refer to FIG. 6, which is a schematic structural diagram of an embodiment of a base station according to the embodiments of the present invention. The base station described in this embodiment includes: a processor 100, configured to use a single beam for each space S region in a to-be-scanned sector of a cell to poll or cover all time T regions in the S region in a time-division manner; a transmitter 200, configured to send, by using a preset frame structure, a synchronization sequence to user equipment in the T region that is obtained by means of processing by the processor, where the frame structure is carried in a beam signal; and a receiver 300, configured to receive a sequence that is fed back by the user equipment.

The processor 100 is further configured to determine a location of the user equipment according to the sequence, and determine, according to the location of the user equipment, a serving beam for the base station to communicate with the user equipment, to confirm that scanning for the user equipment is completed.

In some feasible implementation manners, the processor 100 is further specifically configured to: divide the to-be-scanned sector of the cell into multiple S regions according to a predefined S region division rule, and divide each of the S regions into multiple T regions according to a preset T region division rule.

In some feasible implementation manners, the processor 100 is specifically configured to: determine, according to a quantity of beams emitted by the base station, a quantity M of S regions resulting from division of the to-be-scanned sector, where each of the S regions is corresponding to one beam, and M is equal to the quantity of beams; and divide, according to the S region division rule, the to-be-scanned sector into M equal-sized S regions, or M S regions whose sizes are corresponding to widths of the beams.

In some feasible implementation manners, the processor 100 is further specifically configured to: determine, according to a beam width of a beam emitted by the base station and a size of the S region, a quantity N of T regions resulting from division of the S region; and divide each of the S regions into N T regions in a same division order or a different division order according to the T region division rule.

In some feasible implementation manners, the transmitter 200 is specifically configured to: insert M OFDM symbols into one downlink timeslot in one radio subframe in the frame structure, insert the synchronization sequence into the OFDM symbols, and send the synchronization sequence to the user equipment in the T region by using the OFDM.

In some feasible implementation manners, for a specific implementation process of the base station described in this embodiment of the present invention, refer to the implementation manners that are described in the first embodiment and the second embodiment of the communications device in a high-frequency system according to the embodiments of the present invention. That is, the base station described in this embodiment of the present invention may be the communications device in a high-frequency system according to the embodiments of the present invention, described in the first embodiment or the second embodiment. The processor 100, the transmitter 200, and the receiver 300 that are included in the base station may be specifically applied to the division module, the scan module, and the determining module that are in the communications device in a high-frequency system according to the embodiments of the present invention, described in the first embodiment or the second embodiment. For a specific implementation process, refer to the specific implementation process of the communications device in a high-frequency system according to the embodiments of the present invention, described in the first embodiment or the second embodiment. Details are not described herein again.

Figure 7:
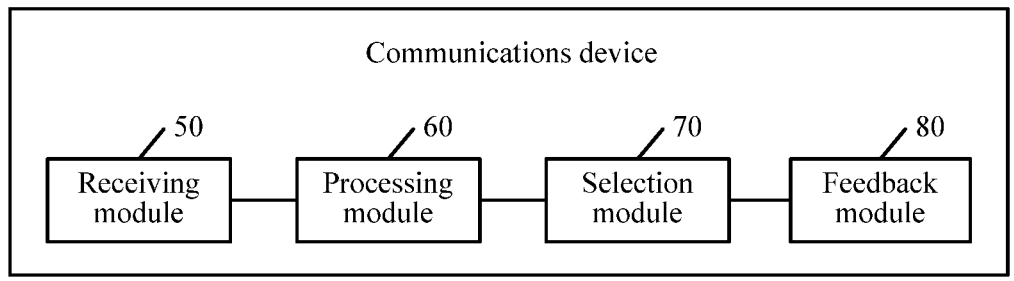
FIG. 7 is a schematic structural diagram of a third embodiment of a communications device in a high-frequency system according to the embodiments of the present invention.

Refer to FIG. 7, which is a schematic structural diagram of a third embodiment of a communications device in a high-frequency system according to the embodiments of the present invention. The communications device described in this embodiment includes: a receiving module 50, configured to emit a beam to perform beam signal scanning and receive beam signals transmitted by a base station; a processing module 60, configured to obtain synchronization sequences from the beam signals received by the receiving module, and correlate all the synchronization sequences; a selection module 70, configured to select a synchronization sequence whose correlation peak value is the largest among correlation peak values that are of all the synchronization sequences and that are obtained by means of processing by the processing module, and set a beam corresponding to the synchronization sequence as a serving beam; and a feedback module 80, configured to insert, into a specified orthogonal frequency division multiplexing OFDM symbol, a sequence corresponding to an ID of the serving beam that is selected by the selection module, and feed back the sequence corresponding to the ID of the serving beam to the base station.

In some feasible implementation manners, the processing module 60 is specifically configured to: obtain an ID of the beam corresponding to the synchronization sequence from OFDM symbols in the beam signal, and sequentially correlate a C_ID, a SEC_ID, an S_ID, and a T_ID in the ID of the beam.

In some feasible implementation manners, the feedback module 80 is specifically configured to: select an OFDM symbol corresponding to a T_ID of the serving beam from OFDM symbols in an uplink timeslot; and insert sequences corresponding to a C_ID, a SEC_ID, and an S_ID of the serving beam into the selected OFDM symbol, and feed back the sequence corresponding to the ID of the serving beam to the base station by using the uplink timeslot.

In some feasible implementation manners, the feedback module 80 is specifically configured to: predefine an OFDM symbol in the uplink timeslot; and insert sequences corresponding to a C_ID, a SEC_ID, an S_ID, and a T_ID of the serving beam into the predefined OFDM symbol, and feed back the sequence corresponding to the ID of the serving beam to the base station by using the uplink timeslot.

In some feasible implementation manners, the communications device in a high-frequency system described in this embodiment may be specifically user equipment, and the user equipment is any user equipment in a cell covered by the base station. In the following embodiment, the user equipment is used as an example to specifically describe the communications device in a high-frequency system according to the embodiments of the present invention.

In some feasible implementation manners, the receiving module 50 of the user equipment may emit a narrow beam to perform scanning, to align with a beam emitted by the base station. The user equipment does not know a specific location of the base station, and therefore, the user equipment needs to perform rotational scanning in an entire space range by using the beam emitted by the user equipment. A size of the entire range that the user equipment needs to scan may be predefined. When the beam emitted by the user equipment (also referred to as a receive beam) is perfectly aligned with the beam emitted by the base station (also referred to as a transmit beam), signal power received by the user equipment is the highest, which means that when the receive beam of the user equipment is not aligned with the transmit beam of the base station, signal power received by the user equipment is lower, which does not help signal demodulation. When the receive beam of the user equipment is perfectly aligned with the transmit beam of the base station, the signal power received by the user equipment is the highest, and the receiving module 50 may obtain information such as the synchronization sequence from the transmit beam of the base station. In specific implementation, a rotational scan cycle of the beam emitted by the receiving module 50 of the user equipment needs to be greater than or equal to a scan cycle of the base station, to better find a beam that is emitted by the base station and that matches the beam. When the beam of the user equipment performs scanning, a beam direction may be changed once at the end of each beam switching cycle until all-around beam scanning is completed. Specifically, the switching cycle may be a time that a beam emitted by the user equipment stays in one scan direction.

In some feasible implementation manners, after the receiving module 50 obtains the synchronization sequences from the transmit beams of the base station, the processing module 60 may correlate the synchronization sequences that are received by the receiving module 50. Specifically, in this embodiment of the present invention, each beam signal sent by the base station and received by the receiving module 50 carries a preset frame structure. In the frame structure, each radio frame includes K1 equal-sized radio subframes, each radio subframe includes K2 equal-sized timeslots, and each timeslot includes K3 OFDM symbols, as shown in FIG. 2, where K1, K2, and K3 are positive integers, and magnitudes of K1, K2, and K3 may be defined according to an actual situation, which are not limited in this embodiment of the present invention. The synchronization sequence sent by the base station is carried in OFDM symbols in the frame structure. The processing module 60 of the user equipment may learn, from the beam signal transmitted by the base station and received by the receiving module 50, a frame structure that is used by the base station to send the synchronization sequence, and obtain the synchronization sequence from the OFDM symbols in the frame structure, and may further obtain the ID of the beam from the OFDM symbols, where the synchronization sequence is corresponding to the ID of the beam in the OFDM symbols. Specifically, the ID of the waveform described in this embodiment of the present invention may include a cell sequence C_ID, a sector sequence SEC_ID, a space sequence S_ID, a time sequence T_ID, and so on. The T_ID is an ID corresponding to a T region (assumably T1) in which the user equipment is located when the base station sends the synchronization sequence to the user equipment, the S_ID is an ID of an S region (assumably S6) in which T1 is located, the SEC_ID is an ID of a sector (assumably a sector 1) in which S6 is located, and the C_ID is an ID of a cell in which the sector 1 is located.

In some feasible implementation manners, because a cell in which the user equipment is located may be covered by multiple base stations, the user equipment may receive multiple beam signals from multiple cells. Therefore, the user equipment needs to select, from the beam signals transmitted by the base stations, an optimal beam to be a serving beam for the user equipment. In this embodiment of the present invention, the optimal beam is a beam that matches the beam emitted by the user equipment, and the matching beam may be specifically a pair of beams whose correlation peak values are the largest. In specific implementation, after obtaining the synchronization sequences from the beam signals transmitted by the base station, the processing module 60 may correlate all synchronization sequences that are transmitted by all the base stations, to obtain a beam whose correlation peak value relative to the beam emitted by the user equipment is the largest. Specifically, the processing module 60 may obtain, from an OFDM symbol of each beam signal, an ID of a beam corresponding to each synchronization sequence, and sequentially correlate a C_ID, a SEC_ID, an S_ID, and a T_ID that are in the ID of the beam. The selection module 70 may select, according to a correlation result that is obtained by means of processing by the processing module 60, a synchronization sequence whose correlation peak value is the largest, and set a beam corresponding to the synchronization sequence as the serving beam for the user equipment. An ID of the beam is an optimal ID. Specifically, the beam direction of the beam emitted by the user equipment changes once at the end of each switching cycle, and therefore, after obtaining a serving beam in one switching cycle, when the beam of the user equipment enters a next switching cycle to perform scanning, the user equipment may obtain a serving beam for the next switching cycle. By analogy, when a scan cycle of the user equipment ends, the user equipment may obtain multiple serving beams. The selection module 70 may sort optimal IDs corresponding to all the serving beams, and select one optimal ID group to be an ID of a final serving beam for the user equipment.

In some feasible implementation manners, after selecting the serving beam by using the selection module 70, the user equipment may feed back, to the base station by using the feedback module 80, the ID of the serving beam including the C_DI, SEC_ID, S_ID, and T_ID, to finally complete signal scanning in the high-frequency system. In specific implementation, the feedback module 80 of the user equipment may select, from OFDM symbols in the uplink timeslot, the OFDM symbol corresponding to the T_ID of the serving beam, insert the sequences corresponding to the C_DI, SEC_ID, and S_ID of the serving beam into the OFDM symbol, and feed back the sequence corresponding to the ID of the serving beam to the base station by using the uplink timeslot. That is, an order of uplink feedback OFDM symbols in the uplink timeslot stays the same as an order of downlink synchronization OFDM symbols in a downlink timeslot. In this case, the user equipment does not need to feed back the T_ID of the serving beam, and when receiving the ID of the serving beam that is fed back by the user equipment, the base station may determine the T_ID of the serving beam according to a location of an OFDM that is used to feed back the beam ID. In the foregoing feedback manner, the feedback module 80 needs to select, from the OFDM symbols in the uplink timeslot, the OFDM symbol corresponding to the T_ID of the serving beam to be the OFDM that is used to feed back the beam ID, and does not need to feed back a sequence corresponding to the T_ID of the serving beam, which can reduce feedback sequences. For example, if an optimal ID corresponding to the serving beam that is selected by the selection module 70 is C_ID=1, SEC_ID=3, S_ID=5, and T_ID=8, the feedback module 80 may insert sequences respectively corresponding to the C_ID=1, SEC_ID=3, and S_ID=5 into a T8 OFDM symbol in the uplink feedback timeslot, and does not need to feed back a sequence corresponding to the T_ID to the base station. In specific implementation, the sequences, described in this embodiment of the present invention, which are corresponding to the C_ID, SEC_ID, and S_ID and which are fed back by the feedback module 80 are all orthogonal sequences, and the orthogonal sequences may be preset.

In some feasible implementation manners, the user equipment may further define an OFDM symbol in an uplink timeslot in advance. This OFDM symbol is used to feed back the ID of the serving beam to the base station, that is, the user equipment does not need to make a selection from all the OFDMs in the uplink timeslot. After the selection module 70 of the user equipment selects the serving beam, the feedback module 80 may insert the sequences corresponding to the C_ID, SEC_ID, S_ID, and T_ID of the serving beam into the predefined OFDM symbol, and feed back the sequence corresponding to the ID of the serving beam to the base station by using the predefined OFDM symbol in the uplink timeslot. For example, if an optimal ID corresponding to the serving beam that is selected by the selection module 70 is C_ID=1, SEC_ID=3, S_ID=5, and T_ID=8, sequences respectively corresponding to the C_ID=1, SEC_ID=3, S_ID=5, and T_ID=8 may be inserted into the predefined OFDM symbol (for example, a second OFDM symbol) in the uplink feedback timeslot. That is, the user equipment does not need to select an OFDM symbol from all the OFDM symbols to be an OFDM symbol that is used to feed back the ID of the serving beam, but needs to feed back the sequence corresponding to the T_ID to the base station. In specific implementation, the sequences, described in this embodiment of the present invention, which are corresponding to the C_ID, SEC_ID, S_ID, and T_ID and which are fed back by the user equipment are all orthogonal sequences, and the orthogonal sequences may be preset.

In this embodiment of the present invention, user equipment may obtain synchronization sequences from beam signals transmitted by a base station, and select a beam corresponding to an optimal ID to be a serving beam by means of sequence correlation, and may further feed back the ID of the serving beam to the base station, to complete synchronization scanning in a high-frequency system. When feeding back the ID of the serving beam to the base station, the user equipment may perform the feedback in an OFDM symbol that is determined according to the ID of the serving beam, or may perform the feedback in a predefined OFDM symbol. This diversifies feedback manners, and improves user experience in synchronization scanning.

Figure 8:
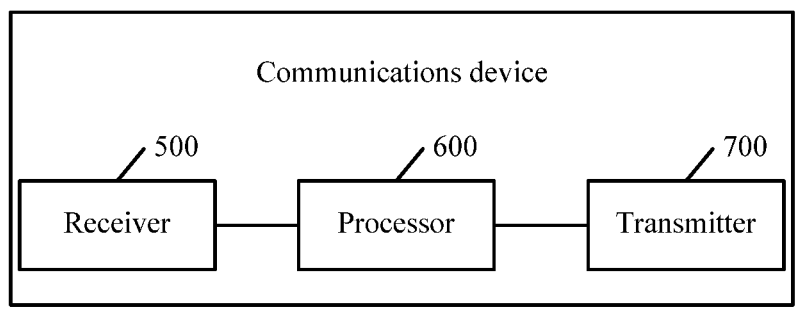
FIG. 8 is a schematic structural diagram of an embodiment of user equipment according to the embodiments of the present invention.

Refer to FIG. 8, which is a schematic structural diagram of an embodiment of user equipment according to the embodiments of the present invention. The user equipment described in this embodiment includes: a receiver 500, configured to emit a beam to perform beam signal scanning and receive beam signals transmitted by a base station; and a processor 600, configured to obtain synchronization sequences from the beam signals received by the receiver, and correlate all the synchronization sequences, where the processor 600 is configured to select a synchronization sequence whose correlation peak value is the largest among correlation peak values of all the synchronization sequences, and set a beam corresponding to the synchronization sequence as a serving beam; and the processor 600 is configured to insert a sequence corresponding to an ID of the serving beam into a specified orthogonal frequency division multiplexing OFDM symbol; and a transmitter 700, configured to feed back the sequence corresponding to the ID of the serving beam to the base station.

In some feasible implementation manners, the processor 600 is specifically configured to: select an OFDM symbol corresponding to a T_ID of the serving beam from OFDM symbols in an uplink timeslot; and insert sequences corresponding to a C_ID, a SEC_ID, and an S_ID of the serving beam into the selected OFDM symbol; and the transmitter 700 is specifically configured to: feed back the sequence corresponding to the ID of the serving beam to the base station by using the uplink timeslot.

In some feasible implementation manners, the processor 600 is specifically configured to: predefine an OFDM symbol in the uplink timeslot; and insert sequences corresponding to a C_ID, a SEC_ID, an S_ID and a T_ID of the serving beam into the predefined OFDM symbol; and the transmitter 700 is specifically configured to: feed back the sequence corresponding to the ID of the serving beam to the base station by using the uplink timeslot.

In some feasible implementation manners, for a specific implementation process of the user described in this embodiment of the present invention, refer to the implementation manner described in the third embodiment of the communications device in a high-frequency system according to the embodiments of the present invention. That is, the user equipment described in this embodiment of the present invention may be the communications device in a high-frequency system according to the embodiments of the present invention, described in the third embodiment. The receiver 500, the processor 600, and the transmitter 700 that are included in the base station may be specifically applied to the receiving module, the processing module, the selection module and the feedback module that are in the communications device in a high-frequency system according to the embodiments of the present invention, described in the third embodiment. For a specific implementation process, refer to the specific implementation process of the communications device in a high-frequency system according to the embodiments of the present invention, described in the third embodiment. Details are not described herein again.

Figure 9:
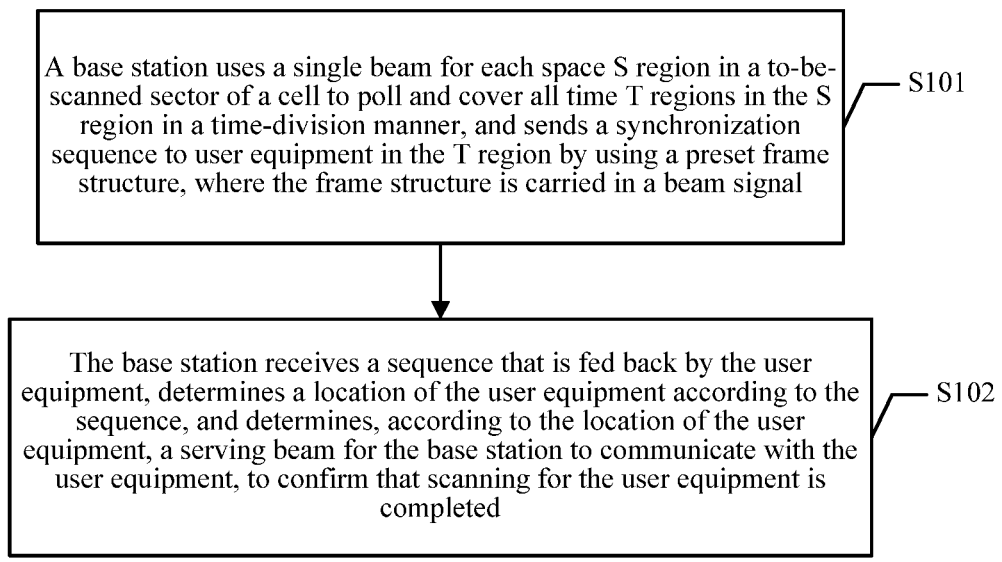
FIG. 9 is a schematic flowchart of a first embodiment of a scanning method in a high-frequency system according to the embodiments of the present invention.

Refer to FIG. 9, which is a schematic flowchart of a first embodiment of a scanning method in a high-frequency system according to the embodiments of the present invention. The scanning method described in this embodiment includes the following steps.

S101. A base station uses a single beam for each space S region in a to-be-scanned sector of a cell to poll or cover all time T regions in the S region in a time-division manner, and sends a synchronization sequence to user equipment in the T region by using a preset frame structure, where the frame structure is carried in a beam signal.

S102. The base station receives a sequence that is fed back by the user equipment, determines a location of the user equipment according to the sequence, and determines, according to the location of the user equipment, a serving beam for the base station to communicate with the user equipment, to confirm that scanning for the user equipment is completed.

In some feasible implementation manners, to implement full coverage of a base station signal in a cell, a base station first needs to implement signal coverage (that is, scanning) in each sector of the cell, and further implement full coverage of the base station signal in the cell by covering all sectors. Therefore, in this embodiment of the present invention, an implementation manner in which a base station covers a sector of a cell is first described specifically. When the base station implements coverage in all sectors of the cell, full coverage in the cell can be implemented.

In specific implementation, the base station may divide a sector of the cell into multiple space regions (S regions for short). Specifically, the cell may be any one of multiple cells that are covered by the base station, and the cell may include multiple sectors. Coverage in any one sector is used as an example for specific description in this embodiment of the present invention. In this embodiment of the present invention, a division action of dividing a sector of the cell into multiple S regions may be executed by the base station or be executed by another device. That is, the another device may be used to divide the cell into the multiple S regions and then send a division result to the base station, and the base station is used to implement signal coverage in the S regions. In addition, a division action of dividing an S region into multiple T regions described in this embodiment of the present invention may also be executed by the base station or be executed by another device, and after performing the division, the another device sends a division result to the base station, and the base station implements coverage in the T regions in the S region. No limitation is imposed herein. In the embodiments of the present invention, a base station divides a sector of a cell into multiple S regions, and then divides each S region into multiple T regions, and a scanning method and an apparatus described in the embodiments of the present invention are described specifically on this basis. Details are not described again in the following embodiments.

In some feasible implementation manners, the base station may divide, according to a preset S region division rule, the to-be-scanned sector (that is, any one sector of the cell) in the cell into the multiple S regions (in this embodiment of the present invention, M is used to represent a quantity of S regions resulting from division of the to-be-scanned sector, M is a positive integer, and a magnitude of M may be defined according to an actual situation). Specifically, according to the preset S region division rule, the base station may evenly divide the to-be-scanned sector into M equal-sized S regions, or may divide the to-be-scanned sector into M unequal-sized S regions. After dividing the to-be-scanned sector into the M S regions, the base station may further divide each of the S regions into multiple smaller regions. That is, the base station may divide, according to a preset time region (T region for short) division rule, each S region into multiple T regions (in this embodiment of the present invention, N is used to represent a quantity of T regions resulting from division of the S region, N is a positive integer, and a magnitude of N may be defined according to an actual situation). For example, the base station may divide the to-be-scanned sector of the cell covered by the base station into 16 S regions, and the 16 S regions may be arranged according to a scan direction of a beam emitted by the base station, that is, the 16 S regions may be arranged into a 4×4 region according to a horizontal scan direction and a vertical scan direction of the beam. After dividing the sector into the 16 S regions, the base station may further divide each S region into 16 T regions, and may further arrange the 16 T regions according to a preset T region division rule. The base station may scan each T region to implement signal coverage in an S region by means of signal coverage in all T regions, implement signal coverage in an entire sector by means of signal coverage in all S regions, and implement signal coverage in the entire cell by means of signal coverage in all sectors.

In some feasible implementation manners, after dividing the to-be-scanned sector into multiple S regions and dividing each S region into multiple T regions, the base station may poll or cover all the T regions. Specifically, the base station may emit multiple beams (for example, M1 beams, where M1 is a positive integer), and each beam may correspondingly cover one S region. In each S region, the base station may use a single beam to poll or cover all T regions in the S region in a time-division manner. That is, all T regions in a same S region may receive a same beam emitted by the base station. For example, the base station may emit 16 high-frequency narrow beams, each beam correspondingly covers one S region, and in each S region, each beam polls and covers all T regions in a time-division manner. That is, a beam that covers an S region (for example, an Sn region) may point to different T regions in the Sn region at different time points. For example, the beam may point to a Tn region in the Sn region at a Tn time point to scan the Tn region.

In some feasible implementation manners, when scanning T regions in an S region by using a beam emitted by the base station, the base station may also add, to a beam signal, a synchronization sequence that is to be sent to user equipment, and sends the synchronization sequence to the user equipment. Specifically, in this embodiment of the present invention, a frame structure may be predefined. As shown in FIG. 2, in the foregoing frame structure, each radio frame may include K1 equal-sized radio subframes, each radio subframe may include K2 equal-sized timeslots, and each timeslot may include K3 OFDM symbols, where K1, K2, and K3 are positive integers, and magnitudes of K1, K2, and K3 may be defined according to an actual situation. Specifically, the base station may insert multiple OFDM symbols into one downlink timeslot in one radio subframe in the frame structure, for sending the synchronization sequence to the user equipment. A quantity of inserted OFDM symbols is equal to the quantity of T regions. In specific implementation, an OFDM symbol includes multiple subcarriers in a frequency domain, and the base station may modulate a corresponding sequence symbol onto some specific subcarriers in the OFDM symbol, so as to insert the synchronization sequence into the OFDM symbol, and send the synchronization sequence to user equipment in a T region by using the OFDM symbol.

In some feasible implementation manners, the base station polls and covers all T regions in each S region in a time-division manner and sends the synchronization sequence to user equipment in each of the T regions by using the frame structure. After receiving the beam signal sent by the base station, the user equipment may obtain the synchronization sequence from the beam signal and further feed back a corresponding sequence according to the obtained synchronization sequence. After receiving the sequence sent by the user equipment, the base station may determine the location of the user equipment according to the sequence, and determines, according to the location of the user equipment, the serving beam for the base station to communicate with the user equipment, to confirm that scanning (that is, signal coverage) for the user equipment is completed.

In this embodiment of the present invention, a base station may divide a to-be-scanned sector into multiple S regions and divides each S region into multiple T regions and further poll all the T regions in each S region in a time-division manner. In addition, the base station may send a synchronization sequence to user equipment in a T region by using a preset frame structure, determine a location of the user equipment according to a sequence that is fed back by the user equipment, and determine, according to the location of the user equipment, a serving beam for the base station to communicate with the user equipment, so as to complete access to the user equipment. In this embodiment of the present invention, when multiple beams are used, a single beam may be used to poll all T regions in a time-division manner, which effectively improves a cell coverage rate under a beam freedom restricted condition, improves user experience in using high-frequency narrow beams to implement cell-wide coverage, and reduces costs for cell-wide coverage.

Figure 10:
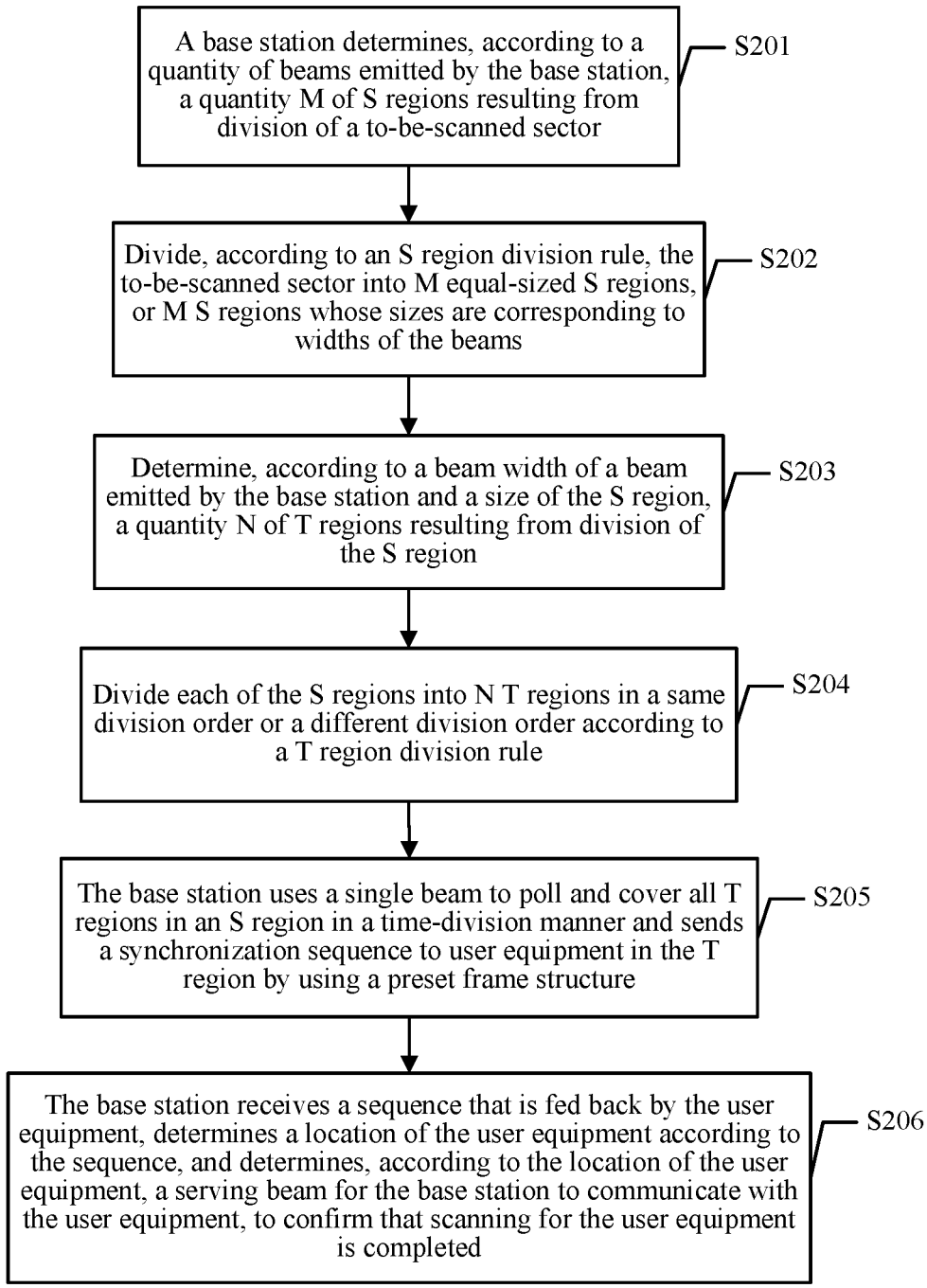
FIG. 10 is a schematic flowchart of a second embodiment of a scanning method in a high-frequency system according to the embodiments of the present invention.

Refer to FIG. 10, which is a schematic flowchart of a second embodiment of a scanning method in a high-frequency system according to the embodiments of the present invention. The scanning method described in this embodiment includes the following steps:

S201. A base station determines, according to a quantity of beams emitted by the base station, a quantity M of S regions resulting from division of a to-be-scanned sector.

S202. Divide, according to an S region division rule, the to-be-scanned sector into M equal-sized S regions, or M S regions whose sizes are corresponding to widths of the beams.

In some feasible implementation manners, for a specific implementation process, described in this embodiment of the present, in which the base station performs region division on a cell, refer to step S101 and S102 in the first embodiment of the scanning method in a high-frequency system according to the embodiments of the present invention, and details are not described herein again.

Further, in this embodiment of the present invention, the S region division rule and a T region division rule are further defined. Specifically, the S region division rule may include: evenly dividing the to-be-scanned sector of the cell to divide the to-be-scanned sector into multiple equal-sized S regions; or dividing the to-be-scanned sector of the cell according to beam widths of beams emitted by the base station, to divide the to-be-scanned sector into multiple S regions whose sizes are corresponding to the beam widths. In specific implementation, when the base station divides the to-be-scanned sector of the cell, the beam widths of the beams emitted by the base station may not be considered, and the to-be-scanned sector is directly divided into multiple equal-sized S regions. If the beam widths of the beams emitted by the base station are considered, the to-be-scanned sector of the cell may be divided according to the beam widths of the beams emitted by the base station. Specifically, when a same beam width is used for the beams emitted by the base station, when dividing the to-be-scanned sector, the base station may evenly divide the to-be-scanned sector, that is, may divide a to-be-scanned region (that is, the to-be-scanned sector) into equal-sized regions. In this case, a division result of the to-be-scanned sector is the same as a division result of the to-be-scanned sector when the beam widths are not considered. As shown in FIG. 4, when a same beam width is used for the beams emitted by the base station, the to-be-scanned sector may be divided into multiple equal-sized S regions (for example, S1-S16, 16 equal-sized regions). In addition, when different beam widths are used for the beams emitted by the base station, when dividing the to-be-scanned sector, the base station may unevenly divide the to-be-scanned sector, that is, may divide, according to a specific beam width of each beam, a to-be-scanned region (that is, the to-be-scanned sector) into multiple unequal-sized regions corresponding to the beam widths. For example, when different beam widths are used for the beams emitted by the base station, the base station may divide the to-be-scanned sector into 16 S regions, where sizes of the S regions are unequal, and a size of each S region is specifically corresponding to the beam width of each beam. In specific implementation, the base station may divide the to-be-scanned sector of the cell into multiple (for example, M) S regions according to the preset S region division rule. Specifically, the base station may determine, according to a beam freedom restricted condition, a quantity M1 of beams that are emitted by the base station, and determine, according to M1, the quantity M of S regions resulting from division of the to-be-scanned sector. Among the beams emitted by the base station, one beam may cover one S region. Therefore, the base station may determine, according to the quantity of beams emitted by the base station, the quantity of S regions resulting from division of the to-be-scanned sector into S regions, that is, M is equal to M1. After M is determined, the base station may divide, according to the S region division rule, the to-be-scanned sector into M equal-sized S regions, or M S regions whose sizes are corresponding to the beam widths. In addition, in this embodiment of the present invention, the sizes of the S regions may be determined jointly by a quantity of antenna array elements and a cell range. More antenna array elements indicate more beams that can be formed, that is, more beams that can be emitted by the base station; and the quantity of S regions is corresponding to the quantity of beams, that is, M is equal to M1. Therefore, when the quantity of antenna array elements is definite, a larger cell range indicates a corresponding larger size of each S region; and when the cell range is definite, more antenna array elements indicate a corresponding smaller size of each S region.

S203. Determine, according to a beam width of a beam emitted by the base station and a size of the S region, a quantity N of T regions resulting from division of the S region.

S204. Divide each of the S regions into N T regions in a same division order or a different division order according to a T region division rule.

In some feasible implementation manners, in this embodiment of the present invention, the T region division rule is further defined. Specifically, the T region division rule may include: dividing all the S regions in a same division order to divide each S region into multiple T regions; or dividing different S regions in different division orders to divide each S region into multiple T regions. In specific implementation, when dividing an S region (assumably an Sn region), the base station may first determine, according to a beam width of a beam emitted by the base station and a size of the Sn region, the quantity N of T regions resulting from division of the Sn region. Specifically, according to a beam width of a beam emitted by the base station, a region size for each scan by the beam may be decided, and with reference to the size of the Sn region, how many scans the beam needs to perform to poll the entire S region may be determined. Therefore, the base station may determine, according to the beam width of the beam emitted by the base station and the size of the Sn region, the quantity N of regions (that is, the quantity of T regions) resulting from division of the S region. After determining the N T regions resulting from division of the Sn region, the base station may divide the Sn region into N T regions in a division order (a same division order or a different division order) specified in the T region division rule. As shown in FIG. 4, the base station may divide an S7 region into 16 even T regions according to a beam width and a size of the S7 region. Specifically, the S7 region may be divided into 16 T regions in a division order specified in the preset T region division rule (assumably a division rule 1). In addition, the base station may further divide another S region into 16 T regions according to the division rule 1, and each division order of T regions is the same as the division order of T regions in the S7 region. In specific implementation, as shown in FIG. 5, the base station may alternatively divide the S7 region into 16 even T regions according to a beam width and a size of the S7 region. Specifically, the base station may divide the S7 region into 16 T regions in a division order specified in the preset T region division rule (assumably a division rule 2), and divide another S region into 16 regions according to the division rule 2. In addition, no division order of T regions is the same as the division rule of T regions in the S7 region, for example, an S6 region and the S7 region.

S205. The base station uses a single beam to poll or cover all T regions in an S region in a time-division manner and sends a synchronization sequence to user equipment in the T region by using a preset frame structure.

S206. The base station receives a sequence that is fed back by the user equipment, determines a location of the user equipment according to the sequence, and determines, according to the location of the user equipment, a serving beam for the base station to communicate with the user equipment, to confirm that scanning for the user equipment is completed.

In some feasible implementation manners, after dividing the to-be-scanned sector into multiple S regions and dividing each S region into multiple T regions, the base station may poll or cover all the T regions. In specific implementation, for a specific implementation process in which the base station polls and covers all the T regions, refer to step S101 and S102 in the first embodiment of the scanning method in a high-frequency system according to the embodiments of the present invention, and details are not described herein again.

In some feasible implementation manners, when scanning T regions in an S region by using a beam emitted by the base station, the base station may also add, to a beam signal, a synchronization sequence that is to be sent to user equipment, and sends the synchronization sequence to the user equipment. Specifically, in this embodiment of the present invention, a frame structure may be predefined. As shown in FIG. 2, in the foregoing frame structure, each radio frame may include K1 equal-sized radio subframes, each radio subframe may include K2 equal-sized timeslots, and each timeslot may include K3 OFDM symbols, where K1, K2, and K3 are positive integers. Specifically, the base station may insert multiple OFDM symbols into one downlink timeslot in one radio subframe in the frame structure, for sending the synchronization sequence to the user equipment. A quantity of inserted OFDM symbols is equal to the quantity of T regions. In specific implementation, an OFDM symbol includes multiple subcarriers in a frequency domain, and the base station may modulate a corresponding sequence symbol onto some specific subcarriers in the OFDM symbol, so as to insert the synchronization sequence into the OFDM symbol, and send the synchronization sequence to user equipment in a T region by using the OFDM symbol.

Further, in this embodiment of the present invention, the synchronization sequence that is sent by the base station to the user equipment may include an ID of the beam that is emitted by the base station to cover the T region. The T region (assumably T1) covered by the beam is a T region in which the user equipment is located. Specifically, the ID of the beam may include a cell sequence C_ID, a sector sequence SEC_ID, a space sequence S_ID, and a time sequence T_ID. The T_ID is an ID corresponding to T1, the S_ID is an ID of an S region (assumably S6) in which T1 is located, the SEC_ID is an ID of a sector (assumably a sector 1) in which S6 is located, and the C_ID is an ID of a cell in which the sector 1 is located.

In some feasible implementation manners, after the base station polls and covers all T regions in each S region in a time-division manner and sends the synchronization sequence to user equipment in each of the T regions by using the frame structure, the user equipment may emit a narrow beam to perform scanning and receive the beam signal transmitted by the base station. After receiving the beam signal sent by the base station, the user equipment may obtain the synchronization sequence from the beam signal and further feed back a corresponding sequence according to the obtained synchronization sequence. After receiving the sequence sent by the user equipment, the base station may determine a location of the user equipment, to confirm that scanning for the user equipment is completed.

In this embodiment of the present invention, a base station may evenly (or unevenly) divide a to-be-scanned sector into multiple S regions according to a predefined S region division rule and divide each S region into multiple T regions according to a predefined T region division rule, and further poll all T regions in each S region in a time-division manner. In addition, the base station may send a synchronization sequence to user equipment in the T region by using a preset frame structure, and determine a location of the user equipment according to a sequence that is fed back by the user equipment, so as to access the user equipment. In this embodiment of the present invention, when multiple beams are used, a single beam may be used to poll all T regions in a time-division manner, which effectively improves a cell coverage rate under a beam freedom restricted condition, improves user experience in using high-frequency narrow beams to implement cell-wide coverage, and reduces costs for cell-wide coverage.

Figure 11:
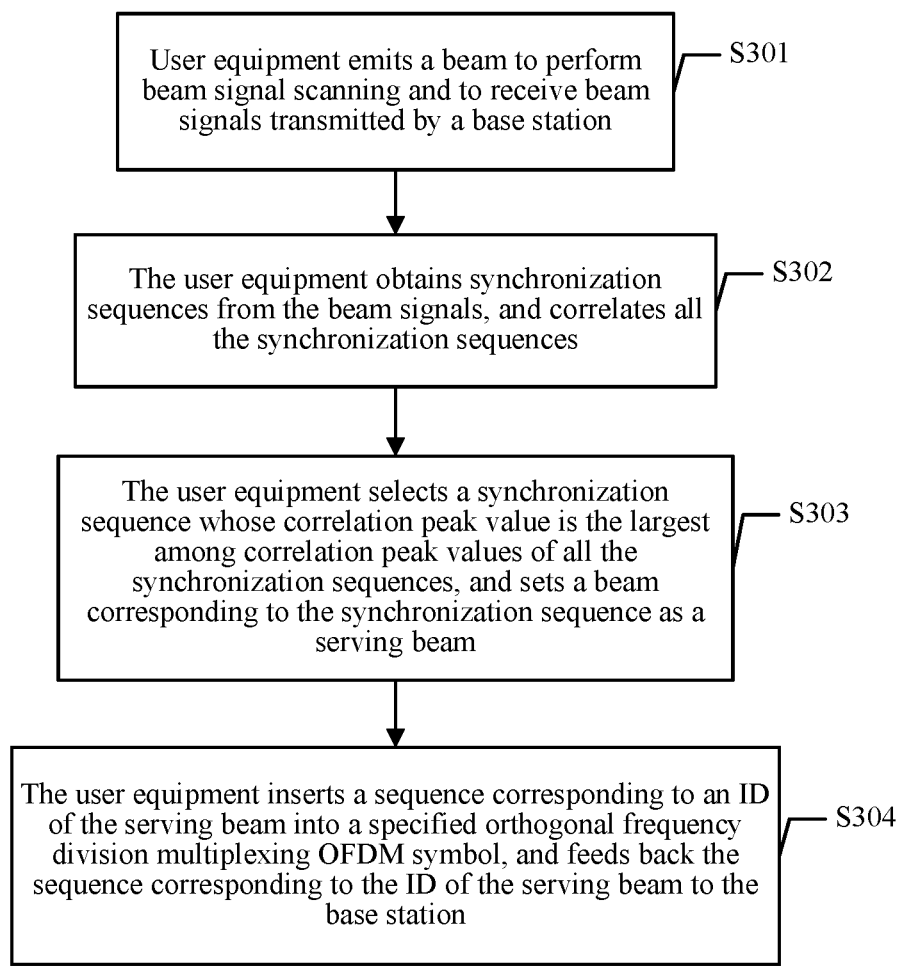
FIG. 11 is a schematic flowchart of a third embodiment of a scanning method in a high-frequency system according to the embodiments of the present invention.

Refer to FIG. 11, which is a schematic flowchart of a third embodiment of a scanning method in a high-frequency system according to the embodiments of the present invention. The scanning method described in this embodiment includes the following steps:

S301. User equipment emits a beam to perform beam signal scanning and to receive beam signals transmitted by a base station.

In some feasible implementation manners, the user equipment may emit a narrow beam to perform scanning, to align with a beam emitted by the base station. The user equipment does not know a specific location of the base station, and therefore, the user equipment needs to perform rotational scanning in an entire space range by using the beam emitted by the user equipment. A size of the entire range that the user equipment needs to scan may be predefined. When the beam emitted by the user equipment (also referred to as a receive beam) is perfectly aligned with the beam emitted by the base station (also referred to as a transmit beam), signal power received by the user equipment is the highest, which means that when the receive beam of the user equipment is not aligned with the transmit beam of the base station, signal power received by the user equipment is lower, which does not help signal demodulation. When the receive beam of the user equipment is perfectly aligned with the transmit beam of the base station, the signal power received by the user equipment is the highest, and information such as the synchronization sequence may further be obtained from the transmit beam of the base station. In specific implementation, a rotational scan cycle of the beam emitted the user equipment needs to be greater than or equal to a scan cycle of the base station, to better find a beam that is emitted by the base station and that matches the beam. When the beam of the user equipment performs scanning, a beam direction may be changed once at the end of each beam switching cycle until all-around beam scanning is completed. Specifically, the switching cycle may be a time that a beam emitted by the user equipment stays in one scan direction.

S302. The user equipment obtains synchronization sequences from the beam signals, and correlates all the synchronization sequences.

S303. The user equipment selects a synchronization sequence whose correlation peak value is the largest among correlation peak values of all the synchronization sequences, and sets a beam corresponding to the synchronization sequence as a serving beam.

In some feasible implementation manners, after obtaining the synchronization sequences from the transmit beams of the base station, the user equipment may correlate the synchronization sequences. Specifically, in this embodiment of the present invention, each beam signal sent by the base station carries a preset frame structure. In the frame structure, each radio frame includes K1 equal-sized radio subframes, each radio subframe includes K2 equal-sized timeslots, and each timeslot includes K3 OFDM symbols, as shown in FIG. 2, where K1, K2, and K3 are positive integers, and magnitudes of K1, K2, and K3 may be defined according to an actual situation, which are not limited in this embodiment of the present invention. The synchronization sequence sent by the base station is carried in OFDM symbols in the frame structure. The user equipment may learn, from the beam signal transmitted by the base station, a frame structure that is used by the base station to send the synchronization sequence, and obtain the synchronization sequence from the OFDM symbols in the frame structure, and may further obtain the ID of the beam from the OFDM symbols, where the synchronization sequence is corresponding to the ID of the beam in the OFDM symbols. Specifically, the ID of the waveform described in this embodiment of the present invention may include a cell sequence C_ID, a sector sequence SEC_ID, a space sequence S_ID, a time sequence T_ID, and so on. The T_ID is an ID corresponding to a T region (assumably T1) in which the user equipment is located when the base station sends the synchronization sequence to the user equipment, the S_ID is an ID of an S region (assumably S6) in which T1 is located, the SEC_ID is an ID of a sector (assumably a sector 1) in which S6 is located, and the C_ID is an ID of a cell in which the sector 1 is located.

In some feasible implementation manners, because a cell in which the user equipment is located may be covered by multiple base stations, the user equipment may receive multiple beam signals from multiple cells. Therefore, the user equipment needs to select, from the beam signals transmitted by the base stations, an optimal beam to be a serving beam for the user equipment. In this embodiment of the present invention, the optimal beam is a beam that matches the beam emitted by the user equipment, and the matching beam may be specifically a pair of beams whose correlation peak values are the largest. In specific implementation, after obtaining the synchronization sequences from the beam signals transmitted by the base station, the user equipment may correlate all synchronization sequences that are transmitted by all the base stations, to obtain a beam whose correlation peak value relative to the beam emitted by the user equipment is the largest. Specifically, the user equipment may obtain, from an OFDM symbol of each beam signal, an ID of a beam corresponding to each synchronization sequence, and sequentially correlate a C_ID, a SEC_ID, an S_ID, and a T_ID that are in the ID of the beam; select, according to a correlation result, a synchronization sequence whose correlation peak value is the largest, and set a beam corresponding to the synchronization sequence as the serving beam for the user equipment. An ID of the beam is an optimal ID. Specifically, the beam direction of the beam emitted by the user equipment changes once at the end of each switching cycle, and therefore, after obtaining a serving beam in one switching cycle, when the beam of the user equipment enters a next switching cycle to perform scanning, the user equipment may obtain a serving beam for the next switching cycle. By analogy, when a scan cycle of the user equipment ends, the user equipment may obtain multiple serving beams, and further may sort optimal IDs corresponding to all the serving beams, and select one optimal ID group as an ID of a final serving beam for the user equipment.

S304. The user equipment inserts a sequence corresponding to an ID of the serving beam into a specified orthogonal frequency division multiplexing OFDM symbol, and feeds back the sequence corresponding to the ID of the serving beam to the base station.

In some feasible implementation manners, after selecting the serving beam, the user equipment may feed back, to the base station, the ID of the serving beam including the C_DI, the SEC_ID, the S_ID, and the T_ID, to finally complete synchronization scanning in the high-frequency system. In specific implementation, the user equipment may select, from OFDM symbols in an uplink timeslot, the OFDM symbol corresponding to the T_ID of the serving beam, insert sequences corresponding to the C_DI, SEC_ID, and S_ID of the serving beam into the OFDM symbol, and feed back the sequence corresponding to the ID of the serving beam to the base station by using the uplink timeslot. That is, an order of uplink feedback OFDM symbols in the uplink timeslot stays the same as an order of downlink synchronization OFDM symbols in a downlink timeslot. In this case, the user equipment does not need to feed back the T_ID of the serving beam, and when receiving the ID of the serving beam that is fed back by the user equipment, the base station may determine the T_ID of the serving beam according to a location of an OFDM that is used to feed back the beam ID. In the foregoing feedback manner, the user equipment needs to select, from OFDM symbols in the uplink timeslot, the OFDM symbol corresponding to the T_ID of the serving beam to be the OFDM that is used to feed back the beam ID, and does not need to feed back a sequence corresponding to the T_ID of the serving beam, which can reduce feedback sequences. For example, if an optimal ID corresponding to the serving beam that is selected by the user equipment is C_ID=1, SEC_ID=3, S_ID=5, and T_ID=8, sequences respectively corresponding to the C_ID=1, SEC_ID=3, and S_ID=5 may be inserted into a T8 OFDM symbol in the uplink feedback timeslot, and there is no need to feed back a sequence corresponding to the T_ID to the base station. In specific implementation, the sequences, described in this embodiment of the present invention, which are corresponding to the C_ID, SEC_ID, and S_ID and which are fed back by the user equipment are all orthogonal sequences, and the orthogonal sequences may be preset.

In some feasible implementation manners, the user equipment may further define an OFDM symbol in an uplink timeslot in advance. This OFDM symbol is used to feed back the ID of the serving beam to the base station, that is, the user equipment does not need to make a selection from all the OFDMs in the uplink timeslot. After selecting the serving beam, the user equipment may insert sequences corresponding to the C_ID, SEC_ID, S_ID, and T_ID of the serving beam into the predefined OFDM symbol, and feed back the sequence corresponding to the ID of the serving beam to the base station by using the predefined OFDM symbol in the uplink timeslot. For example, if an optimal ID corresponding to the serving beam that is selected by the user equipment is C_ID=1, SEC_ID=3, S_ID=5, and T_ID=8, sequences respectively corresponding to the C_ID=1, SEC_ID=3, S_ID=5, and T_ID=8 may be inserted into the predefined OFDM symbol (for example, a second OFDM symbol) in the uplink feedback timeslot. That is, the user equipment does not need to select an OFDM symbol from all the OFDM symbols to be an OFDM symbol that is used to feed back the ID of the serving beam, but needs to feed back the sequence corresponding to the T_ID to the base station. In specific implementation, the sequences, described in this embodiment of the present invention, which are corresponding to the C_ID, SEC_ID, S_ID, and T_ID and which are fed back by the user equipment are all orthogonal sequences, and the orthogonal sequences may be preset.

In this embodiment of the present invention, user equipment may obtain synchronization sequences from beam signals transmitted by a base station, and select a beam corresponding to an optimal ID to be a serving beam by means of sequence correlation, and may further feed back the ID of the serving beam to the base station, to complete synchronization scanning in a high-frequency system. When feeding back the ID of the serving beam to the base station, the user equipment may perform the feedback in an OFDM symbol that is determined according to the ID of the serving beam, or may perform the feedback in a predefined OFDM symbol. This diversifies feedback manners, and improves user experience in synchronization scanning.

The scanning method in a high-frequency system disclosed in this embodiment of the present invention may be applied to a base station or user equipment, and may be specifically implemented by a hardware module such as a receiver, a processor, or a transmitter in the base station or the user equipment. In an implementation process, the steps in the method may be completed by a hardware integrated logic circuit or software instructions in the receiver, transmitter, or processor. The processor may be a general purpose processor, a digital signal processor, an application-specific integrated circuit, a field programmable gate array or other programmable logic device, a discrete gate or transistor logic device, or a discrete hardware component, and is capable of implementing or executing the methods, steps, and logical block diagrams disclosed in the embodiments of the present invention. The general purpose processor may be a microprocessor, any conventional processor, or the like. Steps of the methods disclosed with reference to the embodiments of the present invention may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register.

It should be understood that "one embodiment" or "an embodiment" mentioned throughout this specification means that specific characteristics, structures, or features related to the embodiments are included in at least one embodiment of the present invention. Therefore, "in one embodiment" or "in an embodiment" that appears here and there in the whole specification does not necessarily refer to a same embodiment. In addition, these specific characteristics, structures, or features may be combined in one or more embodiments in any appropriate manner. Sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

It should be understood that in the embodiments of the present invention, "B corresponding to A" means that B is associated with A and that B can be determined according to A. It should also be understood that determining B according to A does not mean determining B according to only A, but determining B according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing base station, device, and module, refer to a corresponding process in the foregoing method embodiments, and details are not described herein again.

In the several embodiments provided in the present application, it should be understood that the disclosed apparatus and method may be implemented in other manners. For example, the described apparatus embodiments are merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

In addition, functional units (or functional modules) in the embodiments of the present invention may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital STA line (DSL) or wireless technologies such as infrared ray, radio and microwave, the coaxial cable, optical fiber/cable, twisted pair, DSL or wireless technologies such as infrared ray, radio and microwave are included in a definition of a medium to which they belong. For example, a disk and disc used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A base station, comprising:
   a processor, configured to:
      acquire a space region of a plurality of space (S) regions in a to-be-scanned sector of a cell, wherein the cell is divided into the plurality of S regions according to a quantity of a plurality of beams emitted by the base station, and wherein the base station is configured to use the plurality of beams to poll or cover each of the plurality of S regions;
      acquire a plurality of time regions (T) of the S region of the plurality of S regions, wherein each S region of the plurality of S regions is respectively divided into a respective plurality of T regions, and wherein in a time period a respective beam of the plurality of beams sequentially polls or covers each T region of the plurality of T regions of each respective plurality of S regions in a time division manner;
   a transmitter, configured to send, using a preset frame structure, a synchronization sequence that is obtained by the processor to a user equipment, wherein the user equipment is located in a T region of the plurality of T regions of the S region of the plurality of S regions, wherein the preset frame structure is carried in the beam of the plurality of beams; and
   a receiver, configured to receive a sequence that is fed back by the user equipment;
   wherein the processor is further configured to determine a location of the user equipment according to the received sequence, and to determine, according to the location of the user equipment, a serving beam for the base station to communicate with the user equipment, and to confirm that scanning for the user equipment is completed.

2. The base station according to claim 1, wherein the processor is further configured to:
   divide the to-be-scanned sector of the cell into the plurality of S regions according to a predefined S region division rule, and divide each of the plurality of S regions into the respective plurality of T regions according to a preset T region division rule.

3. The base station according to claim 2, wherein the processor is further configured to:
   determine, according to the quantity of the plurality of beams emitted by the base station, a quantity M of S regions resulting from division of the to-be-scanned sector, wherein each of the M S regions respectively corresponds to one beam, and M is equal to the quantity of the plurality of beams; and
   divide, according to the predefined S region division rule, the to-be-scanned sector into M equal-sized S regions, or M S regions whose sizes correspond to widths of the corresponding beams.

4. The base station according to claim 2, wherein the processor is further configured to:
   determine, according to a beam width of the beam of the plurality of beams emitted by the base station and a size of the S region of the plurality of S regions, a quantity N of T regions resulting from division of the S region of the plurality of S regions; and
   respectively divide each of the plurality of S regions into N T regions in the same division order or a different division order according to the T region division rule.

5. The base station according to claim 1, wherein the transmitter is further configured to:
   insert M orthogonal frequency division multiplexing (OFDM) symbols into one downlink timeslot in one radio subframe in the frame structure, insert the synchronization sequence into the OFDM symbols, and send the synchronization sequence to the user equipment in a first T region of the plurality of T regions using OFDM.

6. The base station according to claim 5, wherein the synchronization sequence comprises a sequence ID of the beam that is emitted by the base station to scan the first T region; and
   the ID of the beam comprises a cell sequence (C_ID), a sector sequence (SEC_ID), a space sequence (S_ID), and a time sequence (T_ID).

7. A method, comprising:
   acquiring a space region of a plurality of space (S) regions in a to-be-scanned sector of a cell, wherein the cell is divided into the plurality of S regions according to a quantity of a plurality of beams emitted by a base station, and wherein the plurality of beams are used to poll or cover each of the plurality of S regions;
   acquiring a plurality of time regions (T) of the S region of the plurality of S regions, wherein each S region of the plurality of S regions is respectively divided into the plurality of T regions, and wherein in a time period a respective beam of the plurality of beams sequentially polls or covers each T region of the plurality of T regions of each respective S region of the plurality of S regions in a time division manner;
   sending a synchronization sequence to user equipment in a first T region of the plurality of T regions using a preset frame structure, wherein the frame structure is carried in a beam of the plurality of beams; and
   receiving, by the base station, a sequence that is fed back by the user equipment, determining a location of the user equipment according to the sequence, and determining, according to the location of the user equipment, a serving beam for the base station to communicate with the user equipment, and to confirm that scanning for the user equipment is completed.

8. The method according to claim 7, wherein the method further comprises:
   dividing the to-be-scanned sector of the cell into the plurality of S regions according to a predefined S region division rule, and dividing each of the plurality of S regions into the respective plurality of T regions according to a preset T region division rule.

9. The method according to claim 8, wherein dividing the to-be-scanned sector of the cell into the plurality of S regions according to the predefined S region division rule comprises:

determining, according to the quantity of beams emitted by the base station, a quantity M of S regions resulting from division of the to-be-scanned sector, wherein each of the M S regions respectively corresponds to one beam, and M is equal to the quantity of beams; and dividing, according to the predefined S region division rule, the to-be-scanned sector into M equal-sized S regions, or M S regions whose sizes corresponding to widths of the beams.

10. The method according to claim 8, wherein dividing each of the plurality of S regions into the respective plurality of T regions according to the preset T region division rule comprises:

determining, according to a beam width of a beam of the plurality of beams emitted by the base station and a size of the S region of the plurality of S regions, a quantity N of T regions resulting from division of the plurality of S regions; and respectively dividing each of the plurality of S regions into N T regions in the same division order or a different division order according to the T region division rule.

11. The method according to claim 7, wherein sending the synchronization sequence to user equipment in the first T region using the preset frame structure comprises:

inserting M orthogonal frequency division multiplexing (OFDM) symbols into one downlink timeslot in one radio subframe in the frame structure, inserting the synchronization sequence into the OFDM symbols, and sending the synchronization sequence to the user equipment in the first T region using the OFDM.

12. The method according to claim 11, wherein the synchronization sequence comprises a sequence ID of the beam of the plurality of beams that is emitted by the base station to scan the first T region; and the ID of the beam of the plurality of beams comprises a cell sequence C_ID, a sector sequence SEC_ID, a space sequence S_ID, and a time sequence T_ID.

13. A base station, comprising:

a processor, configured to:

determine, according to a quantity of beams of a plurality of beams emitted by the base station, a quantity M of a plurality of space (S) regions resulting from division of a to-be-scanned sector of a cell of the base station, wherein each of the M S regions respectively corresponds to one beam emitted by the base station, M is equal to the quantity of the plurality of beams;

divide, according to a predefined S region division rule, the to-be-scanned sector into M equal-sized S regions, or M S regions whose sizes correspond to widths of the corresponding beams;

divide each of the M S regions into a respective plurality of T regions according to a preset T region division rule;

a transmitter, configured to send, using a preset frame structure, a plurality of synchronization sequences that are obtained by the processor to user equipment in the plurality of T regions of each respective S region of the plurality of S regions, wherein each respective synchronization sequence is carried in a beam of the plurality of beams; and a receiver, configured to receive a sequence that is fed back by the user equipment;

wherein the processor is further configured to determine a location of the user equipment according to the received sequence, and to determine, according to the location of the user equipment, a serving beam for the base station to communicate with the user equipment, and to confirm that scanning for the user equipment is completed.

14. The base station according to claim 13, wherein the processor is further configured to:

determine, according to a beam width of the plurality of beams emitted by the base station and a size of each S region of the plurality of S regions, a quantity N of a plurality of T regions resulting from division of each S region of the plurality of S regions; and respectively divide each of the plurality of S regions into N T regions in the same division order or a different division order according to the T region division rule.

* * * * *